United States Patent
Mimori

(10) Patent No.: US 8,208,361 B2
(45) Date of Patent: Jun. 26, 2012

(54) OBJECTIVE LENS AND OPTICAL PICKUP APPARATUS

(75) Inventor: Mitsuru Mimori, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 107 days.

(21) Appl. No.: 12/922,836

(22) PCT Filed: Mar. 3, 2009

(86) PCT No.: PCT/JP2009/053939
§ 371 (c)(1),
(2), (4) Date: Sep. 15, 2010

(87) PCT Pub. No.: WO2009/116385
PCT Pub. Date: Sep. 24, 2009

(65) Prior Publication Data
US 2011/0007622 A1    Jan. 13, 2011

(30) Foreign Application Priority Data
Mar. 18, 2008  (JP) .................................. 2008-069398

(51) Int. Cl.
*G11B 7/00*  (2006.01)

(52) U.S. Cl. ......... 369/112.23; 369/112.03; 369/112.07; 369/112.12; 359/558; 359/571

(58) Field of Classification Search ............. 369/112.03, 369/112.07, 112.12, 112.23
See application file for complete search history.

(56) References Cited

U.S. PATENT DOCUMENTS

| | | | |
|---|---|---|---|
| 6,807,019 B2* | 10/2004 | Takeuchi et al. | 359/742 |
| 6,807,139 B2* | 10/2004 | Sakamoto | 369/112.07 |
| 6,834,036 B1* | 12/2004 | Shiono et al. | 369/112.03 |
| 6,982,838 B2* | 1/2006 | Maruyama et al. | 359/719 |
| 2004/0047269 A1* | 3/2004 | Ikenaka et al. | 369/112.08 |
| 2005/0105183 A1* | 5/2005 | Hayashi | 359/571 |
| 2006/0256674 A1* | 11/2006 | Ikenaka et al. | 369/44.37 |
| 2009/0034398 A1* | 2/2009 | Kaneda et al. | 369/112.03 |
| 2010/0054109 A1* | 3/2010 | Yasui | 369/112.27 |

FOREIGN PATENT DOCUMENTS

| | | |
|---|---|---|
| JP | 2005-38585 | 2/2005 |
| JP | 2007-294033 | 11/2007 |
| JP | 2007-328886 | 12/2007 |
| WO | WO 2007/102315 | 9/2007 |

* cited by examiner

*Primary Examiner* — Wayne Young
*Assistant Examiner* — Brenda Bernardi
(74) *Attorney, Agent, or Firm* — Cozen O'Connor

(57) ABSTRACT

Provided is an optical pickup device which can properly record and/or reproduce information on and/or from three types of discs having different recording densities and is simple in configuration and low cost. An objective lens is also provided. On the optical surface of the objective lens, an optical path difference giving structure is formed. Out of diffracted light generated when a first luminous flux enters the structure, second order diffracted light has the maximum diffraction volume. Out of diffracted light generated when a second luminous flux enters the structure, zero order diffracted light has the maximum diffraction volume. Out of diffracted light generated when a third luminous flux enters the structure, the minus first order diffracted light has the maximum diffraction volume.

16 Claims, 7 Drawing Sheets

OBJECTIVE LENS AND OPTICAL PICKUP APPARATUS

RELATED APPLICATIONS

This is a U.S. National Phase Application under 35 U.S.C. 371 of International Application No. PCT/JP2009/053939, filed on Mar. 3, 2009.

This application claims the priority of Japanese application no. 2008-069398 filed Mar. 18, 2008, the entire content of which is hereby incorporated by reference.

FIELD OF THE INVENTION

The present invention relates to an optical pickup apparatus that can properly record and/or reproduce information on and/or from different types of optical disks interchangeably, and an objective lens used in this optical pickup apparatus.

BACKGROUND OF THE INVENTION

In recent years, there has been a remarkable development in the technique of an optical pickup apparatus to reduce the wavelength of the laser optical source used as an optical source to record and/or reproduce information on and/or from an optical disk. For example, successful efforts have been made to commercialize a laser light source with a wavelength of 400 through 420 nm including a blue-violet semiconductor laser and a blue SHG laser for converting the wavelength of an infrared semiconductor laser using the second harmonic. When using an objective lens having the same numerical aperture (NA) as that of the DVD (Digital Versatile Disk), use of the blue-violet laser light source allows about 15-GB information to be recorded on an optical disk having a diameter of 12 cm. When the NA of the objective lens is increased to 0.85, about 25-GB information can be recorded on the optical disk having a diameter of 12 cm. In the following description of this Specification, the optical disk using the blue-violet laser light source and magneto-optical disk will be collectively called the high-density optical disk.

In the high-density optical disk using an objective lens having an NA of 0.85, there is an increase in the coma aberration caused by the inclination (skew) of the optical disk. To cope with this problem, the thickness of the protective layer is designed smaller than that in the case of a DVD (0.1 mm as compared to 0.6 mm in the case of DVD) to reduce the coma aberration caused by skew. Incidentally, the high-density optical disk of this type capable of properly recording and/or reproducing information is not sufficient to win the fame of having a commercial value of the optical disk player/recorder (optical information recording/reproducing device). In view of the fact that the DVD and CD (Compact Disk) for recording a great variety of information are available on the market at present, the high-density optical disk of this type capable of properly recording and/or reproducing information itself is not sufficient. For example, to enhance the commercial value of the optical disk player/recorder for a high-density optical disk, it will be necessary to ensure that the DVD and CD (Compact Disk) owned by a user can also properly record and/or reproduce information. Against this backdrop, the optical pickup apparatus mounted on an optical disk player/recorder for a high-density optical disk is required to ensure the capabilities of properly recording and/or reproducing information on and/or from a high-density optical disk, DVD and CD interchangeably.

One of the possible methods for ensuring the capabilities of properly recording and/or reproducing information on and/or from a high-density optical disk, DVD and CD interchangeably is to switch between the optical system for high-density optical disk and the optical system for DVD or CD on a selective basis in response to the recoding density of the optical disk that records and/or reproduces information. This will require a plurality of optical systems and will make it difficult to design a compact configuration of an optical system. This will also increase the production cost.

To ensure the simplified structure and reduced costs of an optical pickup apparatus characterized by compatibility, the optical system for high-density optical disk and the optical system for DVD or CD are preferably integrated for common use so as to minimize the number of the optical components constituting the optical pickup apparatus. Integrating the objective lenses arranged oppositely to the optical disk for common use is the best way to ensure the simplified structure and reduced costs of an optical pickup apparatus. To get a common objective lens for the optical disks of various types having different wavelengths for recording and/or reproduction, an objective optical system must be provided with an optical path difference giving structure wherein spherical aberration depends on wavelength. This will reduce the spherical aberration caused by the differences in wavelength or thickness of the protective layer.

Patent Literature 1 discloses an optical pickup apparatus provided with an optical path difference giving structure and an objective lens that can be used commonly for both high-density optical disk and conventional DVD and CD.

Patent Literature 1: Specification of International Publication Number 2007/102315

DISCLOSURE OF THE INVENTION

Problems to be Solved by the Invention

According to the technique disclosed in the Patent Literature 1, however, the objective lens is provided with a very complicated structure having an optical path difference giving structures superimposed thereon, in order to ensure compatible use among the high-density optical disk, DVD and CD. However, when the optical path difference giving structures disclosed in the Patent Literature 1 are superimposed, two or more independent optical path difference functions can be used for designing. When structures are designed according to different functions, there is no matching in the positions of the level differences determined by functions. There will be a reduction of width (pitch) in the vertical direction of optical axis, depending on the position wherein the optical path difference giving structures are superimposed. Deep grooves or small walls will be produced in the direction of optical axis. This will make it difficult to design molding dies, and may prevent the material from entering the depth of the dies at the time of molding. The optical surface of the molded objective lens will not easily be transferred in an ideal form, with the result that desired optical properties cannot be obtained. Especially the optical surface of the objective lens cannot be transferred in an ideal form, there will be a loss of light volume caused by surface sagging. There has been an intense demand for minimizing this loss of light volume.

In view of the problems described above, it is an object of the present invention to provide an optical pickup apparatus and objective lens that can properly record and/or reproduce information on and/or from three types of disks having different recording densities such as a high-density optical disk (BD in particular), DVD and CD, even when a single lens is used as an objective lens. The aforementioned optical pickup apparatus and objective lens adopts a simple structure to reduce a loss in light volume and provides desired optical properties together with a simplified configuration and reduced production costs.

Means for Solving the Problems

To solve the aforementioned problems, the invention described in Item 1 is an objective lens for use in an optical pickup apparatus which forms a convergent spot on an information-recording surface of a first optical disk having a t1-thick protective layer, using a first light flux having a wavelength $\lambda 1$ emitted from a first light source, forms a convergent spot on an information-recording surface of a second optical disk having a t2-thick protective layer (t1≦t2), using a second light flux having a wavelength $\lambda 2(\lambda 1 < \lambda 2)$ emitted from a second light source, and forms a convergent spot on an information-recording surface of a third optical disk having a t3-thick protective layer (t2<t3), using a third light flux having a wavelength $\lambda 3(\lambda 2 < \lambda 3)$ emitted from a third light source;

the objective lens comprising an optical surface provided with a first optical path difference giving structure, wherein the first optical path difference giving structure emits a L-th order diffracted light with a larger light amount than any diffracted light fluxes with the other diffraction order (including 0-th order), when the first light flux passes through the first optical path difference giving structure, emits a M-th order diffracted light with a larger light amount than any diffracted light fluxes with the other diffraction order, when the second light flux passes through the first optical path difference giving structure, and emits a N-th order diffracted light with a larger light amount than any diffracted light fluxes with the other diffraction order (including 0-th order), when the third light flux passes through the first optical path difference giving structure; and, the following formula is satisfied by the first optical path difference giving structure;

|L|=2, M=0, |N|=1, and the L and N are opposite in positive/negative signs.

Use of the aforementioned first optical path difference giving structure provides a simple configuration of the optical path difference giving structure and facilitates processing of the objective lens molding dies. It also facilitates entry of the resin and glass up to the end of the die at the time of molding operation and increases the production accuracy, so that a light volume very close to the designed value is provided and the loss in the light volume is minimized.

Further, the occurrence of the transmitted light (0-th order diffracted light) with respect to the first light flux is minimized and occurrence of diffracted light is maximized. This permits easy correction of color aberration. A further advantage is a long working distance ensured at the time of using the third optical disk having the thickest protective substrate.

The objective lens described in Item 2 is the same as the objective lens in the invention described in Item 1, wherein the optical surface of the objective lens including:
a central region including the optical axis;
a ring-shaped peripheral region formed around the central region; and
a ring-shaped outermost peripheral region formed around the peripheral region;
wherein the first light flux which passed through the central region, the ring-shaped peripheral region and the ring-shaped outermost peripheral region is converged onto the information-recording surface of the first optical disk;

the second light flux which passed through the central region and the ring-shaped peripheral region is converged onto the information-recording surface of the second optical disk; and the third light flux which passed through the central region is converged onto the information-recording surface of the third optical disk.

The objective lens described in Item 3 is the same as the objective lens in the invention described in Item 2, wherein the first optical path difference giving structure is formed in the central region.

The objective lens described in Item 4 is the same as the objective lens in the invention described in any one of the Items 1 through 3, wherein the first optical disk is a BD (Blu-ray Disk).

The objective lens described in Item 5 is the same as the objective lens in the invention described in any one of the Items 1 through 4, wherein the objective lens is a single lens.

The objective lens described in Item 6 is the same as the objective lens in the invention described in any one of the Items 1 through 5, wherein the first optical path difference giving structure is configured in such a way that a first basic structure and a second basic structure different from the first basic structure are superimposed with each other to ensure that the positions of all the level differences of the first basic structure are overlapped to be matched with the positions of the level differences of the second basic structure.

If any one of the blazed diffraction structure and stepwise diffraction structure is formed into the objective lens for compatible use, a combination of the orders of diffraction of the first, second and third light fluxes of high diffraction efficiency is determined. This involves a problem of reducing the degree of design freedom. Thus, selection of a desired order of diffraction is ensured by superimposition of basic structures as in the present invention. This enhances the degree of design freedom and permits a single optical path difference to be used for designing. Thus, designing ease and a simple configuration of the optical path difference giving structure are ensured, and processing of the objective lens molding dies is facilitated. Further, easy entry of resin or glass deeply into the terminal portions of the dies is provided and the production accuracy is enhanced. A light volume close to the design value is ensured at the time of objective lens molding, and a loss in light volume is minimized.

The invention described in Item 7 is an optical pickup apparatus having an objective lens: which forms a convergent spot on an information-recording surface of a first optical disk having a t1-thick protective layer, using a first light flux having a wavelength $\lambda 1$ emitted from a first light source, forms a convergent spot on an information-recording surface of a second optical disk having a t2-thick protective layer (t1 ≦t2 ), using a second light flux having a wavelength $\lambda 2(\lambda 1 < \lambda 2)$ emitted from a second light source, and forms a convergent spot on an information-recording surface of a third optical disk having a t3-thick protective layer (t2<t3), using a third light flux having a wavelength $\lambda 3(\lambda 2 < \lambda 3)$ emitted from a third light source, the objective lens comprising an optical surface provided with a first optical path difference giving structure, wherein the first optical path difference giving structure emits a L-th order diffracted light with a larger light amount than any diffracted light fluxes with the other diffraction order (including 0-th order), when the first light flux passes through the first optical path difference giving structure, emits a M-th order diffracted light with a larger light amount than any diffracted light fluxes with the other diffraction order, when the second light flux passes through the first optical path difference giving structure, and emits a N-th order diffracted light with a larger Tight amount than any diffracted light fluxes with the other diffraction order (including 0-th order), when the third light flux passes through the first optical path difference giving structure; and, the following formula is satisfied by the first optical path difference giving structure;

|L|=2, M=0, |N|=1, and the L and N are opposite in positive/negative signs.

The optical pickup apparatus described in Item 8 is the same as the optical pickup apparatus in the invention described in Item 7, wherein the optical surface of the objective lens comprising:

a central region including the optical axis;

a ring-shaped peripheral region formed around the central region; and a ring-shaped outermost peripheral region formed around the ring-shaped peripheral region;

wherein the first light flux which passed through the central region, the ring-shaped peripheral region and the ring-shaped outermost peripheral region is converged onto the information-recording surface of the first optical disk;

the second light flux which passed through the central region and the ring-shaped peripheral region is converged onto the information-recording surface of the second optical disk; and the third light flux which passed through the central region is converged onto the information-recording surface of the third optical disk.

The optical pickup apparatus described in Item 9 is the same as the optical pickup apparatus in the invention described in Item 8, wherein the first optical path difference giving structure is formed in the central region.

The optical pickup apparatus described in Item 10 is the same as the optical pickup apparatus in the invention described in any one of the Items 7 through 9, wherein the first optical disk is a Blu-ray Disk.

The optical pickup apparatus described in Item 11 is the same as the optical pickup apparatus in the invention described in any one of the Item 7 through 10, wherein the objective lens is a single lens.

The optical pickup apparatus described in Item 12 is the same as the optical pickup apparatus in the invention described in any one of the Items 7 through 11, wherein the first optical path difference giving structure is configured in such a way that a first basic structure and a second basic structure different from the first basic structure are superimposed with each other to ensure that the positions of all the level differences of the first basic structure are overlapped to be matched with the positions of the level differences of the second basic structure.

The optical pickup apparatus described in Item 13 is the same as the optical pickup apparatus in the invention described in any one of the Items 7 through 12, wherein the formula (1) is satisfied by the image informing magnification m1 of the objective lens when the first light flux enters the objective lens:

$$-0.02 < m1 < 0.02 \tag{1}$$

The optical pickup apparatus described in Item 14 is the same as the optical pickup apparatus in the invention described in Item 13, wherein the formula (2) is satisfied by the image forming magnification m2 of the objective lens when the second light flux enters the objective lens, and the following formula (3) is satisfied by the image forming magnification m3 of the objective lens when the third light flux enters the objective lens:

$$-0.02 < m2 < 0.02 \tag{2}$$

$$-0.02 < m3 < 0.02 \tag{3}$$

The optical pickup apparatus described in Item 15 is the same as the optical pickup apparatus in the invention described in Item 13, wherein the following formula (4) is satisfied by the image forming magnification m2 of the objective lens when the second light flux enters the objective lens:

$$-0.10 < m2 < 0 \tag{4}$$

The optical pickup apparatus described in Item 6 is the same as the optical pickup apparatus in the invention described in any one of the Items 13 through 14, wherein the formula (5) is satisfied by the image forming magnification m3 of the objective lens when the third light flux enters the objective lens:

$$-0.10 < m3 < 0 \tag{5}$$

The optical pickup apparatus of the present invention has at least three light sources—a first, second and third light source. Further, the optical pickup apparatus of the present invention has a light converging optical system which converges the first light flux onto the information-recording surface of the first optical disk, the second light flux onto the information-recording surface of the second optical disk, and the third light flux onto the information-recording surface of the third optical disk. The optical pickup apparatus of the present invention is also equipped with a light-receiving element for receiving the light flux reflected from the information-recording surface of the first, second or third optical disk. In this case, the first light source is preferably a BD (Blu-ray Disk) or HD DVD (hereinafter referred to as "HD"), the second light source is preferably a DVD, and the third light source is preferably a CD, without being restricted thereto. The first, second or third optical disk can be a multi-layered optical disk having a plurality of information-recording surfaces.

The BD uses an objective lens with a NA of 0.85 to record and/or reproduce information. The protective layer has a thickness of about 0.1 mm. The HD uses an objective lens with a NA of 0.65 through 0.67 to record and/or reproduce information. The protective layer has a thickness of about 0.6 mm. Further, the term DVD is a generic name referring to the DVD-based optical disk using an objective lens with a NA of 0.60 through 0.67 to record and/or reproduce information, wherein the protective layer has a thickness of about 0.6 mm. The DVD-ROM includes a DVD-Video, DVD-Audio, DVD-RAM, DVD-R, DVD-RW, DVD+R and DVD+RW. In this Specification, the term CD is a generic name referring to the CD-based optical disk using an objective lens with a NA of about 0.45 through 0.53 to record and/or reproduce information, wherein the protective layer has a thickness of about 1.2 mm. The term CD includes a CD-ROM, CD-Audio, CD-Video, CD-R and CD-RW. BD has the highest recording density, and is followed by BD, DVD and CD in that order.

The thicknesses t1, t2 and t3 of the protective layers preferably meet the following conditional expressions (6), (7) and (8) without being restricted thereto:

$$0.075 \text{ mm} \leq t1 \leq 0.1125 \text{ mm or } 0.5 \text{ mm} \leq t1 \leq 0.7 \text{ mm} \quad (6)$$

$$0.5 \text{ mm} \leq t2 \leq 0.7 \text{ mm} \quad (7)$$

$$1.0 \text{ mm} \leq t3 \leq 1.3 \text{ mm} \quad (8)$$

In this Specification, the first, second and third light sources are preferably laser light sources. A semiconductor laser and silicon laser are preferably used as the laser light source. The following conditional expressions (9) and (10) are preferably satisfied by the first wavelength $\lambda 1$ of the first light flux emitted from the first light source, the second wavelength $\lambda 2$ of the second light flux emitted from the second light source ($\lambda 2 > \lambda 1$), and the second wavelength $\lambda 3$ of the third light flux emitted from the third light source ($\lambda 3 > \lambda 2$):

$$1.5 \times \lambda 1 < \lambda 2 < 1.7 \times \lambda 1 \quad (9)$$

$$1.9 \times \lambda 1 < \lambda 3 < 2.1 \times \lambda 1 \quad (10)$$

When the BD or HD, DVD and CD are used as the first, second and third optical disks, the first wavelength $\lambda 1$ of the first light source is 350 nm or more without exceeding 440 nm, more preferably 380 nm or more without exceeding 415 nm; the second wavelength $\lambda 2$ of the second light source is 570 nm or more without exceeding 680 nm, more preferably 630 nm or more without exceeding 670 nm, and the third wavelength $\lambda 3$ of the third light source is 750 nm or more without exceeding 880 nm, more preferably 760 nm or more without exceeding 820 nm.

Of the first, second and third light sources, at least two can be unitized. The term "unitized" implies that the first and second light sources are fixed and installed in one package, for example, without being restricted thereto. When two light sources are so fixed that aberration cannot be corrected, they can also be said to be "unitized". In addition to the light source, the light-receiving element (to be described later) can also be included in one package.

A light detector such as a photo diode can also be used as the light-receiving element. The light reflected onto the information-recording surface of the optical disk enters the light-receiving element The output signal thereof is used to get the signal of reading the information recorded on each optical disk. Further, focusing inspection or track detection is performed by detecting a change in the amount of light resulting from geometrical changes or positional changes on the light-receiving element. The objective lens can be moved for focusing and tracking, based on the result of detection. The light-receiving element can be made of a plurality of optical detectors. The light-receiving element can be equipped with a main optical detector and sub-optical detector. For example, the light-receiving element can be designed in such a way that two optical detectors are installed on both sides of the optical detector for receiving the main light used to record and/or reproduce information, and the subsidiary light for tracking purposes is received by the two sub-optical detectors. The light-receiving element can contain a plurality of light-receiving elements corresponding to light sources.

The light converging optical system has an objective lens. The light converging optical system can have only the objective lens. It can have a coupling lens such as a collimator, in addition to the objective lens. The coupling lens refers to a single lens or a group of lenses that can be arranged between the objective lens and light source to convert the angle of the light flux diffusion. The collimator is a type of the coupling lens. It is a lens for converting the light entering the collimator into parallel light, which is outputted. The light converging optical system can be provided with an optical element such as a diffractive optical element for separating the light flux emitted from the light source, into the main light flux used to record and/or reproduce information and two subsidiary light fluxes used for tracking and the like. In this Specification, the objective lens is placed oppositely to the optical disk in an optical pickup apparatus. The light flux emitted from the light source is converted onto the information-recording surface of the optical disk by this objective lens. Preferably, the objective lens is placed oppositely to the optical disk in an optical pickup apparatus, and the light flux coming from the light source is converged onto the information-recording surface of the optical disk by this objective lens. Further, this objective lens is preferably an optical system that can be integrally displaced at least in the direction of optical axis by the actuator. Preferably, the objective lens is a single lens, but can be made of a plurality of optical elements. Further, the objective lens can be either a glass lens or plastic lens. The objective lens can be a hybrid lens having an optical path difference giving structure of a photocurable resin provided on a glass lens. The objective lens preferably has a refractive surface made of an aspherical surface. The objective lens preferably has an aspherical base surface provided with the optical path difference giving structure.

When the objective lens is made of a glass lens, it is preferably made of a glass material having a glass-transition temperature Tg without exceeding 400° C. Molding at a relatively low temperature is enabled by using a glass material having a glass-transition temperature Tg without exceeding 400° C., whereby the service life of dies can be prolonged. The glass material having a low glass-transition temperature Tg includes the K-PG325 and K-PG375 (Product name) by Sumida Kogaku Glass Co., Ltd., for example.

Incidentally, the glass lens has a greater specific gravity than the resin lens. If the glass lens is used as an objective lens, a heavy load will be applied onto the actuator driving the objective lens due to the specific gravity thereof. Thus, when the objective lens is made of glass, a glass material having a lower specific gravity is preferably used. To put it more specifically, preferably, its specific gravity does not exceed 3.0. More preferably, its specific gravity does not exceed 2.8.

When the objective lens is made of a plastic lens, it is preferred to use a cyclic olefin-based resin material. It is more preferable to use the cyclic olefin-based resin material wherein the refractive index at a temperature of 25° C. with a wavelength of 405 nm is in the range of 1.52 through 1.60, and the percentage of a change dN/dT (° C.$^{-1}$) in refractive index at a wavelength of 405 nm resulting from a change in temperatures of −5 through 70° C. is −20×10$^{-5}$ through −5×10$^{-5}$ (more preferably −10×10$^{-5}$ through −8×10$^{-5}$). When the objective lens is made of a plastic material, it is preferred to make use of a plastic material to produce a coupling as well.

The following describes the objective lens. At least one of the optical surfaces of the objective lens has a central region and the peripheral region surrounding the central region. At least one of the optical surfaces of the objective lens can have an outermost peripheral region around the peripheral region. The central region is preferably a region including the optical axis of the objective lens, which need not always be included. The central region, peripheral region and outermost peripheral region are preferably located on one and the same optical surface. As shown in FIG. 1, the central region CN, peripheral region MD and outermost peripheral region OT are preferably arranged concentrically about the optical axis on one and the same optical surface. The central region of the objective lens is provided with a first optical path difference giving structure. The peripheral region can be provided with a second optical path difference giving structure. The outermost peripheral region, if any, can be a refractive surface or can be provided with a third optical path difference giving structure. The central region, peripheral region and outermost peripheral region are preferably adjacent to one another. A small space may be present in-between.

The objective lens has a first optical path difference giving structure. The first optical path difference giving structure is preferably arranged at the central region of the objective lens.

The first optical path difference giving structure is preferably arranged at the region 70% or more of the area of the central region of the objective lens, more preferably 90% or more of that area. Still more preferably, the first optical path difference giving structure is arranged over the entire surface of the central region. The second optical path difference giving structure is preferably arranged at the region 70% or more of the area of the peripheral region of the objective lens, more preferably 90% or more of that area. Still more preferably, the second optical path difference giving structure is arranged over the entire surface of the peripheral central region. The third optical path difference giving structure is preferably arranged at the region 70% or more of the area of the outermost peripheral region of the objective lens, more preferably 90% or more of that area. Still more preferably, the third optical path difference giving structure is arranged over the entire surface of the outermost peripheral central region.

Further, if a second optical path difference giving structure is to be provided in the peripheral region, in addition to the first optical path difference giving structure provided in the central region of the objective lens, the second optical path difference giving structure can be provided on the optical surface of the objective lens, but it is preferably provided on one and the same optical surface. When the second optical path difference giving structure is arranged on one and the same optical surface, the eccentric error at the time of production is preferably minimized. The first and second optical path difference giving structures are arranged more preferably on the light source side than on the optical disk side of the objective lens. When viewed from another angle, the first and second optical path difference giving structures are more preferably arranged on the optical surface having a smaller radius, out of two opposed optical surfaces of the objective lens.

The objective lens converges the first, second and third light fluxes passing through the central region provided with the first optical path difference giving structures in such a way as to form convergent spots, respectively. Preferably, the objective lens converges the first light flux passing through the central region equipped with the first optical path difference giving structure of the objective lens in such a way that information will be recorded and/or reproduced on the information-recording surface of the first optical disk. Further, the objective lens converges the second light flux passing through the central region equipped with the first optical path difference giving structure of the objective lens in such a way that information will be recorded and/or reproduced on the information-recording surface of the second optical disk. The objective lens converges the third light flux passing through the central region equipped with the first optical path difference giving structure of the objective lens in such a way that information will be recorded and/or reproduced on the information-recording surface of the third optical disk. If there is a difference between the thickness t1 of the first optical disk and the thickness t2 of the second optical disk, the first optical path difference giving structure preferably corrects the spherical aberration caused by the difference between the thickness t1 of the protective substrate of the first optical disk and the thickness t2 of the protective substrate of the second optical disk, and/or the spherical aberration caused by the difference in wavelengths between the first and second light fluxes, with respect to the first and second light fluxes having passed through the first optical path difference giving structure. Further, the first optical path difference giving structure preferably corrects the spherical aberration caused by the difference between the thickness t1 of the protective substrate of the first optical disk and the thickness t3 of the protective substrate of the third optical disk, and/or the spherical aberration caused by the difference in wavelengths between the first and third light fluxes, with respect to the first and third light fluxes having passed through the first optical path difference giving structure.

When the objective lens is equipped with a second optical path difference giving structure, the objective lens converges the first and second light fluxes passing through the peripheral region using the same in such a way that convergent spots will be formed. Preferably, the objective lens converges the first light flux passing through the peripheral region equipped with the second optical path difference giving structure of the objective lens, in such a way that the information can be recorded and/or reproduced on the information-recording surface of the first optical disk. When the objective lens is equipped with a second optical path difference giving structure, the objective lens converges the second light flux passing through the peripheral region using the same in such a way that information will be recorded and/or reproduced on the information-recording surface of the second optical disk. Preferably, the second optical path difference giving structure corrects the spherical chromatic aberration resulting from the difference in wavelengths between the first and second light fluxes passing through the second optical path difference giving structure.

One of the preferred embodiments is that the third light flux having passed through the peripheral region is not used to record and/or reproduce information on and/or from the third optical disk. It is preferred to provide means to ensure that the third light flux having passed through the peripheral region does not contribute to the formation of convergent spots on the information-recording surface of the third optical disk. To be more specific, when the objective lens is not provided with the second optical path difference giving structure, the third light flux passing through the surrounding region thereby preferably forms a flare on the information-recording surface of the third optical disk. As shown in FIG. 4, in the spot formed on the information-recording surface of the third optical disk by the third light flux having passed through the objective lens, there are the spot center SCN with a high density of light volume, the spot intermediate portion SMD with a density of light volume lower than that of the spot center, and the spot peripheral portion SOT with a density of light volume higher than that of the spot intermediate portion and lower than spot center, wherein the SCN, SMD and SOT are arranged preferably in the order from the optical axis side (or spot center) to the outside. The spot center is used to record and/or reproduce information of the optical disk. The spot center portion is used for recording and/or reproducing information of the optical disk, and the spot intermediate and peripheral portions are not used for recording and/or reproducing information of the optical disk. This spot peripheral portion in the above description is called the flare. To be more specific, the third light flux having passed through the peripheral region of the objective lens preferably forms a spot peripheral portion on the information-recording surface of the third optical disk. Even if the flare were not the one mentioned above, in some cases, there is a spot peripheral portion having a density of light volume lower than that of the spot center, without any spot intermediate portion around the spot center with a high density of light volume. In this case, this spot peripheral portion is called the flare. It should be noted that the convergent spot or spot of the third light flux is preferably a spot in the best focus.

In one of the preferred embodiments with the outermost peripheral region, the first light flux having passed through the outermost peripheral region is used to record and/or reproduce information, but the second and third light fluxes having passed through the outermost peripheral region are not used to record and/or reproduce information of the second and third optical disks. Preferably, the second and third light fluxes having passed through the outermost peripheral region do not contribute to formation of a convergent spot on the information-recording surface of the second and third optical disks. To be more specific, when the objective lens has the outermost peripheral region, the second and third light fluxes passing through the outermost peripheral region are preferred to form a flare on the information-recording surface of the second and third optical disks.

The following describes the optical path difference giving structure.

The first optical path difference giving structure formed on the optical surface of the objective lens emits the L-th order diffracted light with a larger light amount than any diffracted light fluxes with the other diffraction order (including 0-th order), when the first light flux passes through the first optical path difference giving structure; emits the M-th order diffracted light with a larger light amount than any diffracted light fluxes with the other diffraction order, when the second light flux passes through the first optical path difference giving structure; and emits the N-th order diffracted light with a larger light amount than any diffracted light fluxes with the other diffraction order (including 0-th order), when the third light flux passes through the first optical path difference giving structure. Further, the formula |L|=2, M=0, |N|=1 is satisfied, and the L and N are opposite in positive/negative signs. To be more specific, when the L is +2, N is −1. When the L is −2, N is +1. Preferably, L=+2 and N=−1.

The L and N can be said to be opposite in positive/negative signs in the following cases. As the first light flux having passed through the first optical path difference giving structure moves further away from the optical axis, the phase further leads; and as the third light flux having passed through the first optical path difference giving structure moves further away from the optical axis, the phase further lags. Alternatively, as the first light flux having passed through the first optical path difference giving structure moves further away from the optical axis, the phase further lags; and as the third light flux having passed through the first optical path difference giving structure moves further away from the optical axis, the phase further leads. It should be noted that, when the first optical path difference giving structure is designed in a stepwise repeated structure, the aforementioned phase lead/lag phenomenon preferably occurs in the stepwise structure as one of the unit structures.

In the first place, what is called the optical path difference giving structure in this Specification is a generic term to refer to a structure of providing the incoming light flux with differences in optical path. The optical path difference giving structure includes the phase difference giving structure, which provides phase differences. The phase difference giving structure includes a diffraction structure. The optical path difference giving structure of the present invention can be said to be a diffraction structure. The optical path difference giving structure has a level difference, preferably a plurality of level differences. These level differences provide the incoming light flux with optical path differences and/or phase differences. The number of the optical path differences provided by the optical path difference giving structure can be either an integral multiple of the wavelength of the incoming light flux, or a non-integral multiple of the wavelength of the incoming light flux. The level differences can be provided at cyclic intervals in the direction perpendicular to the optical axis, or at non-cyclic intervals in the direction perpendicular to the optical axis.

The optical path difference giving structure preferably has a plurality of rings concentrically arranged about the optical axis. The optical path difference giving structure can take various forms of cross sections (cross sections including the surface of the optical axis). Especially the first optical path difference giving structure is preferably a superimposed structure made up of a first basic structure wherein the cross section including the optical axis is designed in a blazed structure, and a second basic structure wherein the cross section including the optical axis is designed in a stepwise structure. The blazed structure indicates a. serrated configuration of the cross section including the optical axis of the optical element provided with the optical path difference giving structure, as shown in FIGS. 2a and 2b. To put it another way, the optical path difference giving structure has an oblique surface that is neither perpendicular nor parallel to the base surface. Further, the stepwise structure indicates a stepwise configuration of the cross section including the optical axis of the optical element provided with the optical path difference giving structure, as shown in FIGS. 2c and 2d. To put it another way, the optical path difference giving structure has only the surface that is perpendicular to the base surface and optical axis, without any surface oblique to the base surface. Further, when the basic structure is stepwise, if the base surface has a radius, light is reflected on the base surface. This will cause the refraction angle to be different according to each of the distances from the optical axis. Thus, the stepwise structure is preferably obtained by shifting the base surface by the same length of the optical path in the traveling direction of light, rather than by parallel shifting of the base surface in the direction of optical axis.

When the first and second basic structures are superimposed to form a first optical path difference giving structure, a second basic structure different from the first basic structure is preferably superimposed onto the first basic structure in such a way that the positions of all the level differences of the first basic structure will match those of the level differences of the second basic structure. "Matching" in the sense in which it is used here refers to the matching between the deepest position P1 of the first basic structure as the blazed structure of FIG. 3a and the deepest position P2 of the second basic structure as the stepwise structure of FIG. 3b, for example. (As shown in FIG. 3, while the positions of all the level differences of the first basic structure match those of the level differences of the second basic structure, the positions of the level differences of the second basic structure may not match those of the level differences of the first basic structure, in some cases). This provides the first optical path difference giving structure of FIG. 3c. In this case, a plurality of units of rings of the second basic structure can also be superimposed onto the ring as one unit of the first basic structure. The ring as one unit of the second basic structure can also be superimposed onto a plurality of units of rings of the first basic structure. For the second and third optical path difference giving structures, the basic structures may not be superimposed. In this case, a desired structure shown in FIG. 2 can be adopted.

The optical path difference giving structure or basic structure is preferably based on the cyclic repetition of a prescribed unit configuration. "The cyclic repetition of a prescribed unit configuration" in the sense in which it is used here naturally includes the repetition of one and the same configuration at a prescribed cycle. Further, "the cyclic repetition of a prescribed unit configuration" also includes the case wherein the unit configuration as one unit of the cycle has its cycle gradually increased or decreased with a prescribed regularity.

When the optical path difference giving structure or basic structure has a blazed structure, the serrated configuration as a unit configuration is repeated. As shown in FIG. 2a, one and the same serrated configuration can be repeated. Alternatively, as shown in FIG. 2b, the size of the serrated configuration can be gradually increased or decreased as one goes toward the base surface. Further, a combination of the increasing size of the serrated configuration and the decreasing size of the serrated configuration can also be used. However, even in the case of the gradually changing size of the serrated configuration, it is preferred that there should be almost no change of the size in the direction of optical axis (or in the traveling direction of light) in the serrated configuration. It should be noted that, in the blazed configuration, the length of one serrated configuration in the direction of optical axis (or the length in the traveling direction of light passing through the serrated configuration) is called the pitch depth, while the length of one serrated configuration in the direction perpendicular to optical axis is called the pitch width. Further; it is also possible to adopt such a structure that, in a certain region, the blazed-shaped level difference faces opposite to the optical axis (center), and in other regions, the blazed-shaped level difference faces the optical axis (center). A shift region required to switch the blazed-shape level difference can be located in-between. When the optical path provided by the optical path difference giving structure as the optical path difference giving structure is expressed by the function of optical path difference, this shift region is the region corresponding to the point that will be the extreme value for the function of optical path difference. It should be noted that, when the optical path difference function has a point that will be an extreme value, the inclination of the optical path difference function will be reduced. This allows the ring pitch to be increased, and serves to minimize a reduction in the transmittance resulting from geometrical errors of the optical path difference giving structure.

When the optical path difference giving structure or basic structure has a stepwise configuration, a stepwise configuration as a unit configuration is repeated. It is possible that the small same steps are repeated, wherein the number of steps is as shown in FIG. 2c (4, 5 steps). (The configuration of FIG. 2c may be called a five-piece stepwise configuration). It is also possible to adopt such a structure that, as one goes toward the base surface, the size of the step is gradually increased or decreased. In this case, it is preferred that there should be almost no change to the length in the direction of optical axis (or in the traveling direction of light).

When the optical path difference giving structure has a binary configuration as shown in FIG. 2d, the size of the binary configuration can be gradually increased or decreased as one goes toward the base surface. It is preferred that there should be almost no change of the length in the direction of the traveling light. This binary configuration is also included in the two-piece stepwise configuration as mentioned in this Specification.

The following describes an example of the first and second basic structures constituting the optical path difference giving structure wherein, of the diffracted beams of light occurring when the first light flux has been inputted, the second order diffracted beam of light has the maximum diffraction volume.

Of the diffracted beams of light occurring when the second light flux has been inputted, the 0-th order diffracted beam of light has the maximum diffraction volume. Of the diffracted beams of light occurring when the third light flux has been inputted, the minus first order diffracted beam of light has the maximum diffraction volume. However, the present invention is not restricted to the following example.

The first basic structure is an optical path difference giving structure that:

emits the first order diffracted light with a larger light amount than any diffracted light fluxes with the other diffraction order when the first light flux passes through the first basic structure;

emits the first order diffracted light of the second light flux with a larger light amount than any diffracted light fluxes; and emits the first order diffracted light of the third light flux with a larger light amount than any diffracted light fluxes. The first basic structure is preferably designed in a blazed structure, for example, as shown in FIGS. 2a and 2b.

The first basic structure is preferably designed in a blazed structure as shown in FIG. 6, and the level difference is preferably such that the level difference volume d1 in the direction of optical axis gives an optical path difference of $1 \cdot \lambda 1 \pm 0.4 \cdot \lambda 1$ to the wavelength $\lambda 1$ of the first light flux. To put it more specifically, the level difference volume d1 of the first basic structure in the central region preferably meet the following conditional expression:

$$(\lambda 1 - 0.4\lambda 1)/(n-1) \leq d1 \leq (\lambda 1 + 0.4\lambda 1)/(n-1)$$

wherein "n" denotes the refractive index of the objective lens in the first light flux.

In the optical path difference giving structure of a blazed configuration such as the first basic structure, the diffraction efficiency can be calculated according to the following formula [Mathematical Formula 1]

Blazed configuration [Mathematical Formula 1]

$$\eta_m = \left[ \frac{\sin(\pi(\alpha m_B - m))}{\pi(\alpha m_B - m)} \right]^2$$

wherein $$\alpha = \frac{\lambda_B}{\lambda} \left[ \frac{n(\lambda) - 1}{n(\lambda)_B - 1} \right]$$

In the above formula, $\eta m$ is a diffraction efficiency for diffraction order m; $\lambda$ is a wavelength; $n(\lambda)$ is a refractive index at $\lambda$; m is an order of diffraction for blazing, $\lambda B$ is a reference wavelength (blazed wavelength); $n(\lambda B)$ is a refractive index at $\lambda B$; and mB is a blazed order of diffraction. Further, the relationship between the level difference volume d in the direction of the optical axis and order of diffraction m can be $m \sim (n-1) \cdot d/\lambda$.

The second basic structure is an optical path difference giving structure that emits the first order diffracted light with a larger light amount than any diffracted light fluxes with the other diffraction order when the first light flux passes through the second basic structure; emits the minus first order diffracted light of the second light flux with a larger light amount than any diffracted light fluxes; and emits the minus first order diffracted light of the third light flux with a larger light amount than any diffracted light fluxes; or is an optical path difference giving structure that emits the minus first order diffracted light with a larger light amount than any diffracted light fluxes with the other diffraction order when the first light flux passes through the second basic structure; emits the first order diffracted light of the second light flux with a larger light amount than any diffracted light fluxes; and emits the first order diffracted light of the third light flux with a larger light amount than any diffracted light fluxes. The shape of the second basic structure is preferably designed in a stepwise configuration as shown in FIG. 2c.

The second basic structure is preferably designed in a four-piece stepwise configuration as shown in FIG. 7, and the level difference volume d21 of the small stepwise level difference in the direction of optical axis is preferably such that an optical path of $1.25 \cdot \lambda 1 \pm 0.2 \cdot \lambda 1$ is given to the wavelength $\lambda 1$ of the first light flux, while the level difference volume d22 of the large stepwise level difference in the direction of optical axis is preferably such that an optical path of $3.75 \cdot \lambda 1 \pm 0.2 \cdot \lambda 1$ is given to the wavelength $\lambda 1$ of the first light flux. To put it more specifically, the level difference volume d21 of the small stepwise configuration of the second basic structure in the central region preferably meets the following conditional expression:

$$(1.25\lambda 1 - 0.2\lambda 1)/(n-1) \leq d21 \leq (1.25\lambda 1 + 0.2\lambda 1)/(n-1)$$

wherein "n" denotes the refractive index of the objective lens in the first light flux.

The level difference volume d22 of the large stepwise configuration of the second basic structure in the central region preferably meets the following conditional expression:

$$(3.75\lambda 1 - 0.2\lambda 1)/(n-1) \leq d22 \leq (3.75\lambda 1 + 0.2\lambda 1)/(n-1)$$

wherein "n" denotes the refractive index of the objective lens in the first light flux.

In the stepwise optical path difference giving structure of the second basic structure, the diffraction efficiency can be calculated according to the formula [Mathematical Formula 2]:

Stepwise configuration [Mathematical Formula 2]

$$\eta_m = \left[ \frac{\sin\pi \frac{m}{N}}{\pi m} \cdot \frac{\sin\pi(\beta - m)}{\sin\pi \frac{(\beta - m)}{N}} \right]^2$$

wherein $$\beta = d \cdot N \cdot \frac{\lambda_B}{\lambda} \left[ \frac{n(\lambda) - 1}{n(\lambda)_B - 1} \right]$$

In the above formula, $\eta m$ is a diffraction efficiency for diffraction order m; $\lambda$ is a wavelength; $n(\lambda)$ is a refractive index at $\lambda$; m is an order of diffraction for blazing; $\lambda B$ is a reference wavelength (blazed wavelength); $n(\lambda B)$ is a refractive index at $\lambda B$; d is a phase shift (unit: $\lambda B$), and N is a number of steps (number of divided pieces).

The first basic structure formed by the superimposition between the first and second basic structures is preferably designed in a four-piece blazed stepwise superimposed configuration as shown in FIG. 8, and the level difference volume D11 of the small level difference of blazed stepwise superimposed configuration in the direction of optical axis is preferably such that an optical path of $1.25 \cdot \lambda 1 \pm 0.2 \cdot \lambda 1$ is given to the wavelength $\lambda 1$ of the first light flux, while the level difference volume D12 of the large level difference of blazed stepwise superimposed configuration in the direction of optical axis is preferably such that an optical path of $4.75 \cdot \lambda 1 \pm 0.2 \cdot \lambda 1$ is given to the wavelength $\lambda 1$ of the first light flux. To put it more specifically, at least the level difference volume D11 closest to the optical axis of the small level difference and large level difference of blazed stepwise superimposed configuration in the first optical path difference giving structure at the central region preferably meet the following conditional expression. All the level difference volumes D11 and D12 of the optical path difference giving structures in the central region preferably meet the following conditional expression. In the case of the level difference apart from the optical axis, the level difference requires consideration given to the curvature on the aspherical surface of the objective lens, and the volumes D11 and D12 of the level difference apart from the optical axis tend to increase gradually. There may be a level difference which is slightly greater than the volume shown in the following conditional expression.

$$(1.25\lambda 1 - 0.2\lambda 1)/(n-1) \leq D11 \leq (1.25\lambda 1 + 0.2\lambda 1)/(n-1)$$

$$(4.75\lambda 1 - 0.2\lambda 1)/(n-1) \leq D12 \leq (4.75\lambda 1 + 0.2\lambda 1)/(n-1)$$

wherein "n" denotes the refractive index of the objective lens in the first light flux.

In the optical path difference giving structure, the diffraction efficiency can also be calculated according to the following formula [Mathematical Formula 3]:

$$\eta_m = \left[ \int_0^1 f(x) \cdot e^{-i2\pi \cdot mx} dx \right]^2 \qquad \text{[Mathematical Formula 3]}$$

Wherein f(x) is a function indicating the phase difference caused by the optical path difference giving structure.

Since the first and second basic structures have different orders of diffraction wherein the diffraction volumes thereof are maximized, the diffraction volume of the order of diffraction can be maximized. The first optical path difference giving structure is formed by superimposition between the first and second basic structures. This configuration permits a change in the directions of all the outgoing beams of the first, second and third light fluxes having passed through the first optical path difference giving structure. Thus, even if all the first, second and third light fluxes have entered the objective lens at one and the same imaging magnification (e.g., parallel light fluxes exclusively), it is possible to correct the aberration caused by the use of different types of optical disks, whereby mutual compatibility is ensured. Moreover, superimposition can be configured to ensure that all the positions of the level differences of the first basic structure match the positions of the level differences of the second basic structure. This configuration provides a simplified structure and minimizes the loss in the amount of light resulting from production error.

When the objective lens is made of a plastic lens, a third basic structure as a temperature characteristic correction structure further superimposed onto the first and second basic structures can be used as the first optical path difference giving structure. To put it more specifically, the level difference volume of the third basic structure in the direction of the optical axis is preferably such as to give the optical path difference equivalent to approximately ten first wavelengths to the first light flux, to give the optical path difference equivalent to approximately six second wavelengths to the second light flux, and to give the optical path difference equivalent to approximately five third wavelengths to the third light flux.

The second optical path difference giving structure formed on the optical surface of the objective lens emits the P-th order diffracted light with a larger light amount than any diffracted light fluxes with the other diffraction order (including 0-th order), when the first light flux passes through the second optical path difference giving structure; emits the Q-th order diffracted light with a larger light amount than any diffracted light fluxes with the other diffraction order, when the second light flux passes through the second optical path difference giving structure; and emits the R-th order diffracted light with a larger light amount than any diffracted light fluxes with the other diffraction order (including 0-th order), when the third light flux passes through the second optical path difference giving structure. Further, the formula |P|=1, Q=0, and |R|=1 is satisfied, and the positive/negative signs of the P and Q are preferably the same, without being restricted thereto. P=+1 and R=+1 are preferred. When the formula |P|=1, Q=0, and |R|=1 is satisfied, and the positive/negative signs of the P and Q are the same, the second optical path difference giving structure is preferably made of the fourth and fifth basic structures superimposed on each other. The fourth basic structure is so structured as to maximize the first-order diffraction volumes of all the first, second and third light fluxes. The fifth basic structure is preferably configured in such a way that the 0th-order diffraction volumes are maximized for the first and third light fluxes, and the minus first order diffraction volume is maximized for the second light flux. However, it is also possible to adopt a structure having at least one of the basic structures. When the second optical path difference giving structure is configured in such a way that the n-th order diffraction volume (wherein n is an integer without being zero) is maximized for the first light flux, the phases can be easily connected in the central region and peripheral region. Further, the second optical path difference giving structure is preferably configured to ensure that the 0-th order diffraction volume is maximized for the second light flux. When the objective lens is a plastic lens, a sixth basic structure as a temperature characteristic correction structure further superimposed onto the fourth and fifth basic structures can be used as the second optical path difference giving structure. To put it more specifically, the level difference volume of the sixth basic structure in the direction of optical axis is preferably such as to give the optical path difference equivalent to approximately five first wavelengths to the first light flux, to give the optical path difference equivalent to approximately three second wavelengths to the second light flux, and to give the optical path difference equivalent to approximately two third wavelengths to the third light flux.

When an outermost peripheral region is provided and the objective lens is made of a plastic lens, a third optical path difference giving structure is preferably provided further on the outermost peripheral region. In this case, it is also possible to adopt such a structure that the third optical path difference giving structure has at least a seventh basic structure. This makes it possible to freely select the order of diffraction of the diffracted light that occurs most frequently when the first, second and third light fluxes have passed through the seventh basic structure.

When the outermost peripheral region has a third optical path difference giving structure, it is also possible to adopt such a structure that the third optical path difference giving structure corrects the sphero-chromatism (chromatic spherical aberration) resulting from a slight change in the wavelength of the first light source, for the first light flux having passed through the third optical path difference giving structure. A slight change in the wavelength refers to the change within ±10 nm. For example, when the first light flux has changed ±5 nm with respect to the wavelength $\lambda 1$, a change in the spherical aberration of the first light flux having passed through the outermost peripheral region is preferably corrected by the third optical path difference giving structure. The amount of change in the wavefront aberration on the information-recording surface of the first optical disk is preferably 0.001 $\lambda 2$ rms or more without exceeding 0.070 $\lambda 2$ rms.

As described above, it is preferred that the level difference volume should not be excessive. If the level difference volume of the ring having an optical path difference giving structure as a basis obtained by superimposition of a plurality of basic structures is greater than the reference value, the level difference volume of the ring is reduced by 10·$\lambda$B/(n−1) (μm). This arrangement reduces the excessive level difference volume without affecting the optical performances. A desired value can be set as a reference value. Preferably, 10·$\lambda$B/(n−1) (μm) is used as a reference value.

A slender ring is more preferred for production. From this viewpoint., it is preferred that, in all the rings of the first optical path difference giving structure, the value of (level difference volume/pitch width) should not exceed 1. More preferably, this value does not exceed 0.8. Still more preferably, in all the rings of all the optical path difference giving structures, the value of (level difference volume/pitch width) should not exceed 1. Still more preferably, this value does not exceed 0.8.

Assume that NA1 denotes the numerical aperture on the image side of the objective lens required to record and/or reproduce information on and/or from the first optical disk; NA2 denotes the numerical aperture on the image side of the objective lens required to record and/or reproduce information on and/or from the second optical disk (wherein NA1≧NA2); and NA3 denotes the numerical aperture on the image side of the objective lens required to record and/or reproduce information on and/or from the third optical disk (wherein NA2>NA3). NA1 is preferably 0.6 or more without exceeding 0.9, more preferably 0.8 or more without exceeding 0.9. NA2 is preferably 0.55 or more without exceeding 0.7, more preferably 0.60 or 0.65. NA3 is preferably 0.4 or more without exceeding 0.55, more preferably 0.45 or 0.53. The numerical apertures on the image side of the objective lens required to record and/or reproduce information on and/or from the first, second and third optical disks are preferably within the aforementioned ranges of NA1, NA2 and NA3.

The boundary between the central region and peripheral region of the objective lens is formed in the portion equivalent to the range of 0.9·NA3 or more without exceeding 1.2·NA3 (more preferably 0.95·NA3 or more without exceeding 1.15·NA3), when the third light flux is used. More preferably, the boundary between the central region and peripheral region is formed in the portion equivalent to the NA3. Further, the boundary between the peripheral region and outermost peripheral region of the objective lens is formed in the portion equivalent to the range of 0.9·NA2 or more without exceeding 1.2·NA2 (more preferably 0.95·NA2 or more without exceeding 1.15·NA2), when the second light flux is used. More preferably, the boundary between the peripheral region and outermost peripheral region is formed in the portion equivalent to the NA2.

When the third light flux having passed through the objective lens is converged on the information-recording surface of the third optical disk, the spherical aberration preferably has at least one discontinuous portion. In this case, the discontinuous portion is preferably located in the range of 0.9·NA3 or more without exceeding 1.2·NA3 (more preferably 0.95·NA3 or more without exceeding 1.15·NA3) when the third light flux is used.

When the spherical aberration is continuous without any discontinuous portion and the third light flux having passed through the objective lens is to be converged on the information-recording surface of the third optical disk, the absolute value of the longitudinal spherical aberration is preferably 0.03 µm or more for the NA2, and the absolute value of the longitudinal spherical aberration is preferably 0.02 µm or less for the NA3. More preferably, the absolute value of the longitudinal spherical aberration is 0.08 µm or more for the NA2, and the absolute value of the longitudinal spherical aberration is 0.01 µm or less for the NA3.

Further, diffraction efficiency depends on the diffraction structure. This permits the diffraction efficiency for each wavelength in the central region to be properly set in conformity to the usage of the optical pickup apparatus. For example, in the case of an optical pickup apparatus wherein information is recorded and/or reproduced on and/or from the first optical disk, and information is only reproduced from the second and third optical disks, the diffraction efficiency of the central and/or peripheral region is set preferably by placing prime importance on the first light flux. On the other hand, in the case of an optical pickup apparatus wherein information is only reproduced from the first optical disk and information is reproduced on and/or from the second and third optical disks, the diffraction efficiency of the central region is set preferably by placing prime importance on the second and third light fluxes, and the diffraction efficiency of the peripheral region is set preferably by placing prime importance on the second light flux.

In any case, if the following conditional expression (13) is satisfied, the diffraction efficiency of the first light flux calculated by the weighted average of the area of each region can be maintained at a higher level.

$$\eta 11 \leq \eta 21 \quad (13)$$

wherein $\eta 11$ denotes the diffraction efficiency of the first light flux in the central region and $\eta 21$ indicates the diffraction efficiency of the first light flux in the peripheral region. When the diffraction efficiency of the central region is set by placing prime importance on the second and third light fluxes, the diffraction efficiency of the first light flux in the central region is reduced. However, if the numerical aperture of the first optical disk is greater than that of the third optical disk, the reduction in the diffraction efficiency in the central region does not give a serious effect, when considered in terms of the overall effective diameter of the first light flux.

The diffraction efficiency in the present Specification can be defined as follows:

[1] The transmittance of the objective lens having one and the same focal distance, lens thickness and numerical aperture and being made of one and the same material without being provided with a second optical path difference giving structure is measured separately for each of the central region and peripheral region. In this case, the transmittance at the central region is measured by blocking the light flux entering the peripheral region, and the transmittance at the peripheral region is measured by blocking the light flux entering the central region.

[2] The transmittance of the objective lens having the first and second optical path difference giving structures is measured separately for each of the central region and peripheral region.

[3] The value obtained by dividing the result of [2] by the result of [1] is considered as the diffraction efficiency of each region.

It is also possible to adopt such a structure that the light usage efficiency of any two of the first, second and third light fluxes is 30% or more without exceeding 70%, and the light usage efficiency of the remaining light flux is 30% or more without exceeding 70%. The light usage efficiency of the remaining light flux can be 40% or more without exceeding 60%. In this case, the light flux whose light usage efficiency is 30% or more without exceeding 70% (or 40% or more without exceeding 60%) is preferably the third light flux.

What is called the light usage efficiency here is defined as the result of dividing "A" by "B", wherein "A" is the amount of light inside the Airy's disk of the convergent spot formed on the information-recording surface of the optical disk by the objective lens provided with first optical path difference giving structure (or provided with the second and third optical path difference giving structures), and "B" is the amount of light inside the Airy's disk of the convergent spot formed on the information-recording surface of the optical disk by the objective lens being made of one and the same material and having one and the same focal distance, on-shaft thickness, numerical aperture and wavefront aberration without being provided with first, second or third optical path difference giving structure. What is called the Airy's disk here is a circle with a radius f centering on the optical axis of the convergent spot. r' is expressed by $0.61 \cdot \lambda/NA$.

In the third light flux having passed through the first optical path difference giving structure, when the difference between the diffraction volume of the order of diffraction producing the greatest amount of light and the diffraction volume of the order of diffraction producing the second greatest amount of light, namely, the difference between the diffraction volume forming the best focus and the diffraction volume forming the second best focus is 0% or more without exceeding 20%, it is difficult to maintain satisfactory tracking characteristics especially in the third optical disk. However, the embodiment of the present invention maintains satisfactory tracking characteristics in such a case as well.

The best focus characterized by the greatest amount of the spot light formed by the third light flux and the second best focus characterized by the second greatest amount of the spot light are formed by the third light flux having passed through the first optical path difference giving structure of the objective lens. Preferably, the best focus is located where the diameter of the spot formed by the third light flux is the smallest, and the second best focus is located where the diameter of the spot formed by the third light flux is the second smallest. The best focus in the sense in which it is used here preferably refers to the point wherein the beam waist is minimized within a prescribed defocused range. To put it another way, depending on the third light flux, the best focus and second best focus are formed. This signifies that, in the third light flux, there are at least two points wherein the beam waist is minimized within a prescribed defocused range. When the difference between the diffraction efficiency of the diffracted light forming the best focus and the diffraction efficiency of the diffracted light forming the second best focus does not exceed 20%, the advantages of the present invention are fully demonstrated.

The spot formed by the third light flux in the best focus is preferably used to record and/or reproduce information on and/or from the third optical disk and the spot formed by the third light flux in the second best is preferably not used to record and/or reproduce information on and/or from the third optical disk. However, this does not deny the embodiment wherein the spot formed by the third light flux in the best focus is not used to record and/or reproduce information on and/or from the third optical disk, but the spot formed by the third light flux in the second best focus is used to record and/or reproduce information on and/or from the third optical disk. When the first optical path difference giving structure is arranged on the surface of the objective lens on the light source side, the second best focus is preferably closer to the objective lens than the best focus.

The best and second best focuses meet the following formula (11):

$$0.05 < L/f3 < 0.50 \quad (11)$$

wherein f3 [mm] indicates the focal distance of the third light flux which passes through the first optical path difference giving structure to form the best focus and L [mm] indicates the distance between the best focus and second best focus.

The following formula (11)' is preferably satisfied:

$$0.1 < L/f3 < 0.35 \quad (11)'$$

L is preferably 0.18 mm or more without exceeding 0.30 mm and f is preferably 1.8 mm or more without exceeding 3.0 mm.

The aforementioned structure ensures that the unwanted light of the third light flux that is not used to record and/or reproduce information on and/or from the third optical disk will not give an adverse effect to the light-receiving element for tracking, at the time of recording and/or reproducing information on and/or from the third optical disk. Thus, satisfactory tracking performances can be maintained at the time of recording and/or reproducing information on and/or from the third optical disk. In addition, this structure prevents the pitch of the first optical path difference giving structure from becoming excessively small, and ensures easy production of the objective lens and enhanced light usage efficiency.

Further, assume that the focal distance of the first light flux of the objective lens is f1 (mm), and the center thickness of the objective lens is d (mm). In this case, the following formula (12) is satisfied:

$$0.7 \leq d/f1 \leq 1.5 \quad (12)$$

The following formula (12)' is more preferably satisfied:

$$1.0 \leq d/f1 \leq 1.5 \quad (12)'$$

The aforementioned structure ensures the working distance of the CD as a third optical disk without reducing the pitch of the optical path difference giving structure, and ensures easy production of the objective lens and enhanced light usage efficiency.

The following conditional expression is preferably satisfied:

$$2.1 \text{ mm} \leq \phi \leq 4.2 \text{ mm}$$

wherein $\phi$ indicates the effective diameter of the objective lens when the first optical disk is used. If The aforementioned conditional expression is satisfied, the working distance of the CD as a third optical disk can be kept at the level without any operational problems, and aberration changes resulting from temperature change are maintained at a satisfactory level without any problems.

The first, second and third light fluxes can enter the objective lens as parallel beams of light or the objective lens as divergent light or convergent light. The imaging magnification m1 of the objective lens at the time of entry of the first light flux into the objective lens preferably meets the following formula (1):

$$-0.02 < m1 < 0.02 \quad (1)$$

In the meantime, when the first light flux enters the objective lens as divergent light, the imaging magnification m1 of the objective lens at the time of entry of the first light flux into the objective lens preferably meets the following formula (1'):

$$-0.10 < m1 < 0 \quad (1')$$

When the second light flux enters the objective lens as parallel light or approximate parallel light, the imaging magnification m2 of the objective lens at the time of entry of the second light flux into the objective lens preferably meets the following formula (2):

$$-0.02 < m2 < 0.02 \quad (2)$$

In the meantime, when the second light flux enters the objective lens as divergent light, the imaging magnification m2 of the objective lens at the time of entry of the second light flux into the objective lens preferably meets the following formula (4):

$$-0.10 < m2 < 0 \quad (4)$$

When the third light flux enters the objective lens as parallel light or approximate parallel light, the imaging magnification m3 of the objective lens at the time of entry of the third light flux into the objective lens preferably meets the following formula (3):

$$-0.02 < m3 < 0.02 \quad (3)$$

When the third light flux is parallel light, a tracking problem will be likely to occur. However, the present invention ensures that, even if the third light flux is parallel light, satisfactory tracking properties are maintained, and information can be properly recorded and/or reproduced on and/or from three different types of optical disks.

In the meantime, when the third light flux enters the objective lens as divergent light, the imaging magnification m3 of the objective lens at the time of entry of the third light flux into the objective lens preferably meets the following formula (5):

$$-0.10 < m3 < 0 \quad (5)$$

The working distance (WD) of the objective lens at the time of using the third optical disk is 0.20 mm or more without exceeding 1.5 mm, preferably 0.3 mm or more without exceeding 1.20 mm. The working distance (WD) of the objective lens at the time of using the second optical disk is preferably 0.4 mm or more without exceeding 1.3 mm. The working distance (WD) of the objective lens at the time of using the first optical disk is preferably 0.4 mm or more without exceeding 1.2 mm.

The optical information recording/reproducing apparatus is provided with an optical disk drive unit having the aforementioned optical pickup apparatus.

The following describes the optical disk drive unit mounted on the optical information recording/reproducing apparatus. The optical disk drive unit is available in two types. In one of the two types, only the tray capable of supporting the optical disk mounted thereon is taken out of the optical information recording/reproducing apparatus incorporating the optical pickup apparatus. In the other the type, the optical disk drive unit together with the optical disk drive unit main body including the optical pickup apparatus is taken out.

The optical information recording/reproducing apparatus using the aforementioned types is generally provided with the following components without being restricted thereto. The optical information recording/reproducing apparatus includes an optical pickup apparatus mounted on the housing and others; an optical pickup apparatus drive source such as a seek motor and others for moving the optical pickup apparatus together with the housing toward the inner or outer periphery of the optical disk; an optical pickup apparatus transport unit having a guide rail for guiding the housing of the optical pickup apparatus toward the inner or outer periphery of the optical disk; and spindle motor for driving the optical disk.

In addition to these components, the optical pickup apparatus of the former type preferably includes a tray capable of holding the optical disk mounted thereon, and a loading mechanism for sliding the tray. The optical pickup apparatus of the latter type includes a tray and is preferably provided with a drawer equivalent to the chassis wherein each component can be pulled out, but is not provided with a tray or loading mechanism.

Effects of the Invention

The present invention characterized by a simple structure and low production cost properly records and/or reproduces information on and/or from three different types of optical disks (e.g., high density optical disk using a blue-violet laser light source, DVD and CD) using only one objective lens. Further, the present invention provides an optical pickup apparatus, objective lens and optical information recording/reproducing apparatus wherein information can be recorded and/or reproduced on and/or from three different types of optical disks using a single-lens objective lens. The present invention further provides an objective lens characterized by easy production and capability of reducing the amount of loss resulting from production errors.

DESCRIPTION OF REFERENCE NUMERALS

AC two-axis actuator
PPS dichroic prism
CL collimating lens
LD1 blue-violet semiconductor laser
LM laser module
OBJ objective lens
PL1 protective substrate
PL2 protective substrate
PL3 protective substrate
PU1 optical pickup apparatus
RL1 information-recording surface
RL2 information-recording surface
RL3 information-recording surface
CN central region
MD peripheral region
OT outermost peripheral region

DETAILED DESCRIPTION OF THE PREFERRED EMBODIMENT

Figure 5:
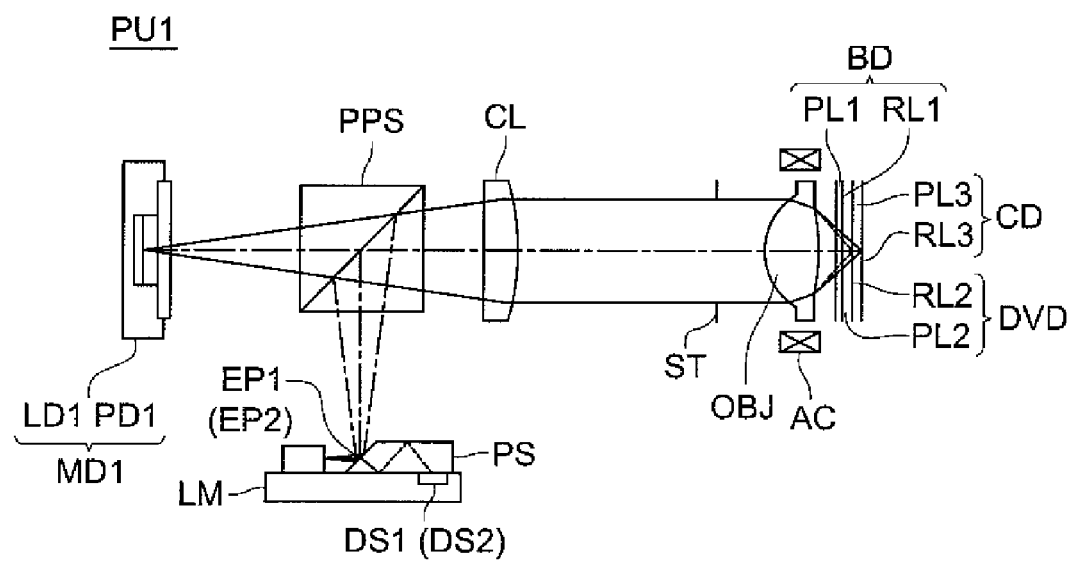
FIG. 5 is a drawing schematically showing the structure of the optical pickup apparatus of the present invention.

The following describes the embodiments of the present invention with reference to the drawings. FIG. 5 is a drawing schematically showing the structure of the optical pickup apparatus of the present embodiment capable of recording and/or reproducing information on and/or from three different types of optical disks—BD, DVD and CD. This optical pickup apparatus PU1 is mounted on an optical information recording/reproducing apparatus. Here assume that the first optical disk is a BD, the second optical disk is a DVD, and the third optical disk is a CD. It should be noted that the present invention is restricted to these embodiments described below.

The optical pickup apparatus PU1 includes:
an objective lens OBJ;
a stop ST;
a collimating lens CL;
a dichroic prism PPS;
a first semiconductor laser LD1 (first light source) that emits light when recording and/or reproducing information on and/or from the BD and which outputs a laser light flux (first light flux) having a wavelength $\lambda 1$ of 405 nm;
a first light-receiving element PD1 for receiving the light flux reflected from the information-recording surface RL1 of the BD; and
a laser module LM.

The laser module LM includes:
a second semiconductor laser EP1 (second light source) that emits light when recording and/or reproducing information on and/or from the DVD and which outputs a laser light flux (second light flux) having a wavelength $\lambda 2$ of 658 nm;
a third semiconductor laser EP2 (third light source) which emits light when recording and/or reproducing information on and/or from the CD and which outputs a laser light flux (third light flux) having a wavelength $\lambda 3$ of 785 nm;
a second light-receiving element DS1 for receiving the light flux reflected from the information-recording surface RL2 of the DVD;
a third light-receiving element DS2 for receiving the light flux reflected from the information-recording surface RL3 of the CD; and
a prism PS.

Figure 1A:
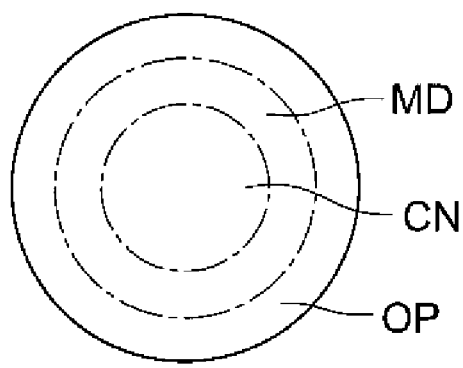
FIG. 1a is a drawing showing an example of the objective lens OBJ used in the present invention as viewed in the direction of optical axis, with FIG. 1b being a cross sectional view of the same example.
Figure 1B:
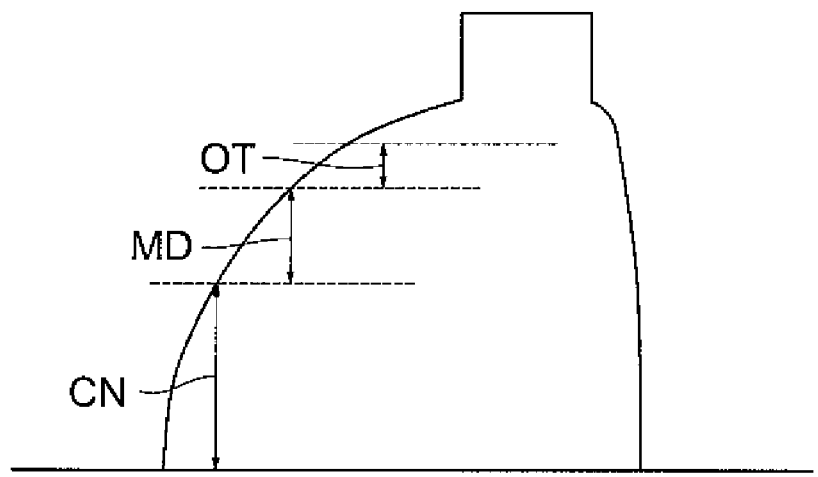
Figure 2A:
FIG. 2 is a cross sectional view schematically showing the examples (a) through (d) of the optical path difference giving structure formed on the objective lens OBJ in the present invention.
Figure 2B:
Figure 2C:
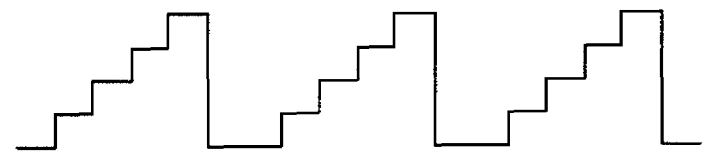
Figure 2D:
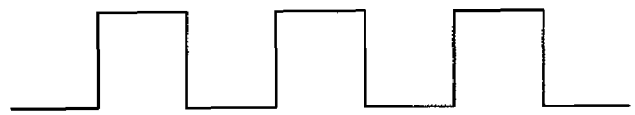
Figure 3A:
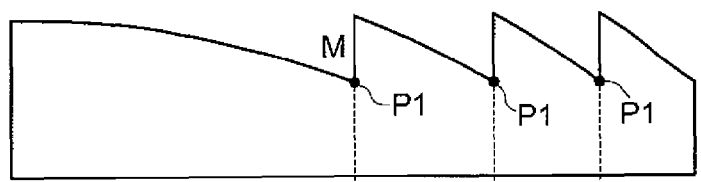
FIG. 3 is a drawing showing the superimposition of optical path difference giving structures.
Figure 3B:
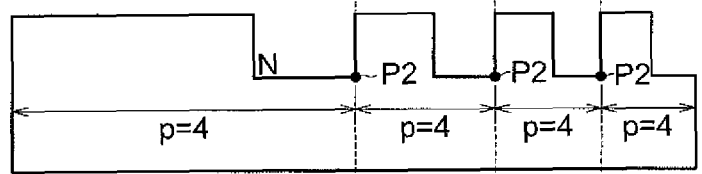
Figure 3C:
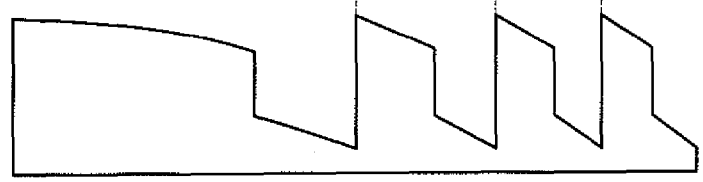
Figure 4:
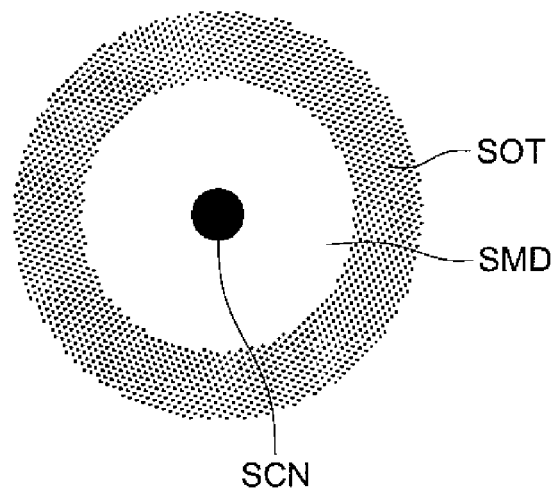
FIG. 4 is a drawing showing the configuration of a spot formed by the objective lens of the present invention.

As shown in FIGS. 1a and 1b, in the objective lens OBJ of the present embodiment, a central region CN including the optical axis on the aspherical optical surface of the light source side, a peripheral region MD formed around the central region CN, and an outermost peripheral region OT formed further around the peripheral region MD are concentrically arranged about the optical axis as a center. Although not illustrated, a first optical path difference giving structure composed of a superimposition between the first basic structure and second basic structure is formed on the central region CN. A second optical path difference giving structure is formed on the peripheral region MD. A third optical path difference giving structure is formed on the outermost peripheral region OT. The first optical path difference giving structure emits the second order diffracted light with a larger light amount than any diffracted light fluxes with the other diffraction order when the first light flux passes through; emits the 0-th order diffracted light of the second light flux with a larger light amount than any diffracted light fluxes; and emits the minus first order diffracted light of the third light flux with a larger light amount than any diffracted light fluxes. Further, the second optical path difference giving structure emits the first order diffracted light with a larger light amount than any diffracted light fluxes with the other diffraction order when the first light flux passes through; emits the 0-th order diffracted light of the second light flux with a larger light amount than any diffracted light fluxes; and emits the first order diffracted light of the third light flux with a larger light amount than any diffracted light fluxes. The third optical path difference giving structure emits the second order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. The percentage of the areas of the central region, peripheral region and outermost peripheral region in FIGS. 1a and 1b is not precisely shown.

Figure 6:
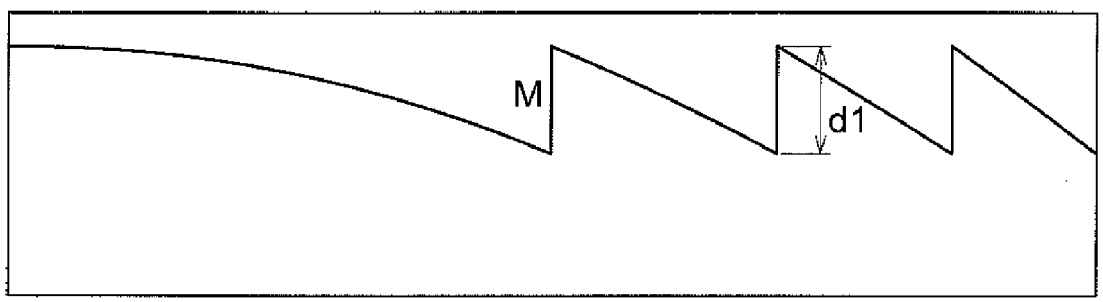
FIG. 6 is an enlarged view showing an example of the first basic structure as viewed in the direction of the optical axis.
Figure 7:
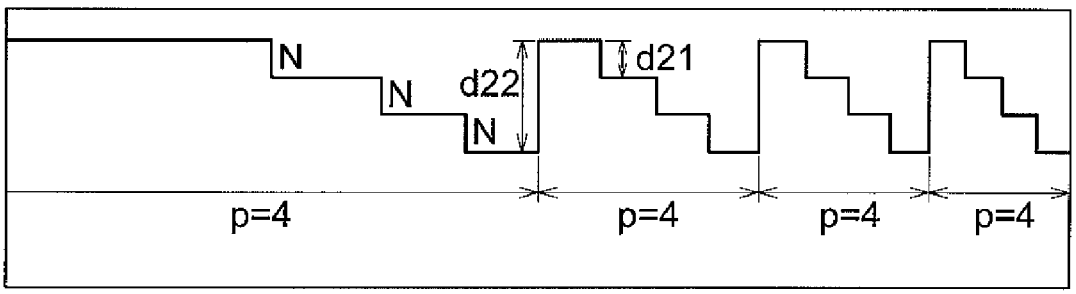
FIG. 7 is an enlarged view showing an example of the second basic structure as viewed in the direction of the optical axis.
Figure 8:
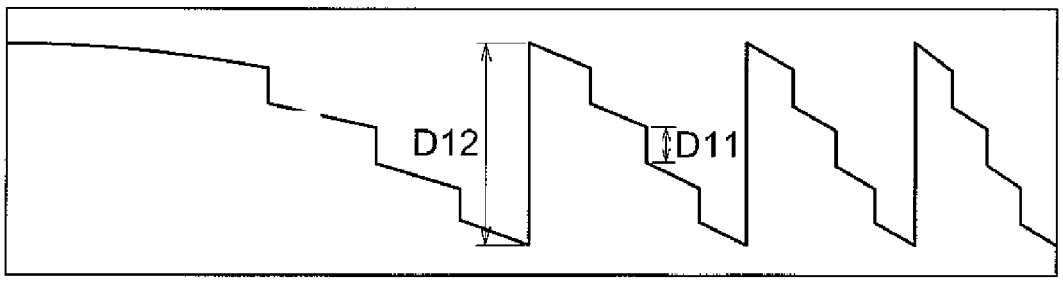
FIG. 8 is an enlarged view showing an example of the first optical path difference giving structure made of a superimposition of the first and second basic structures, as viewed in the direction of the optical axis.

FIG. 8 is a partially enlarged view showing the first optical path difference giving structure. The first optical path difference giving structure is formed by superimposition between the first and second basic structures in such a way that all the level differences of the first basic structure will match those of the second basic structure. The first basic structure is designed in a blazed configuration and emits the first order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. Part of the first basic structure is shown in an enlarged form in FIG. 6. The second basic structure is a four-piece stepwise configuration and emits the first order diffracted light with a larger light amount than any diffracted light fluxes with the other diffraction order when the first light flux passes through; emits the minus first order diffracted light of the second light flux with a larger light amount than any diffracted light fluxes; and emits the minus first order diffracted light of the third light flux with a larger light amount than any diffracted light fluxes. Part of the second basic structure is shown in an enlarged form in FIG. 7.

The second optical path difference giving structure is formed by superimposition between the fourth and fifth basic structures in such a way that all the level differences of the fourth basic structure will match those of the fifth basic structure. The fourth basic structure is designed in a blazed configuration and emits the first order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. The fifth basic structure is a three-piece stepwise configuration and emits the 0-th order diffracted light with a larger light amount than any diffracted light fluxes with the other diffraction order when the first light flux passes through; emits the minus first order diffracted light of the second light flux with a larger light amount than any diffracted light fluxes; and emits the 0-th order diffracted light of the third light flux with a larger light amount than any diffracted light fluxes.

The third optical path difference giving structure is made up of the seventh basic structure alone. The seventh basic structure is designed in a blazed configuration and emits the second order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes.

Figure 9:
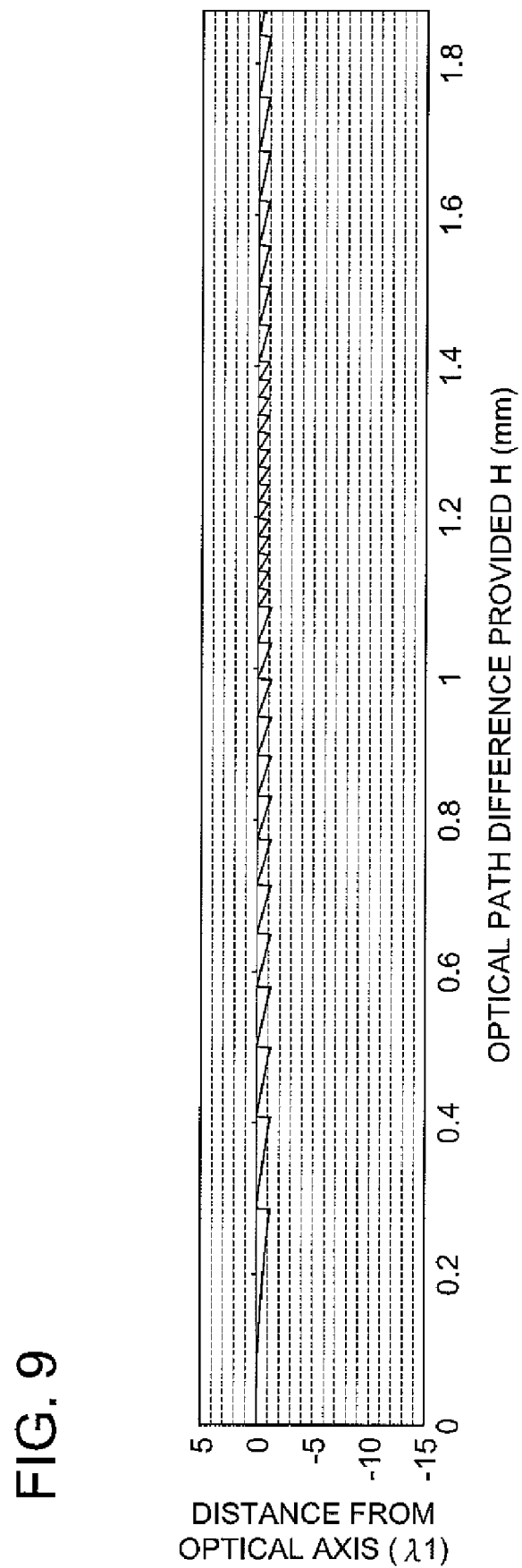
FIG. 9 is an enlarged view showing an example of the first, fourth and seventh basic structures, as viewed in the direction of the optical axis.
Figure 10:
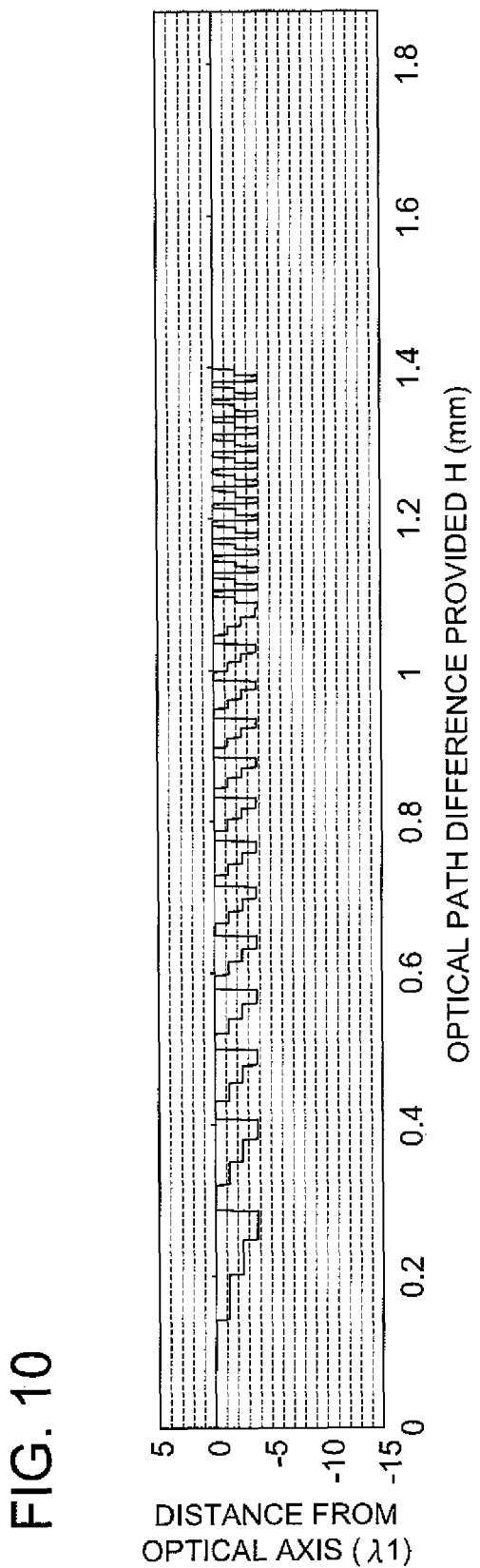
FIG. 10 is an enlarged view showing an example of the second and fifth basic structures, as viewed in the direction of the optical axis.
Figure 11:
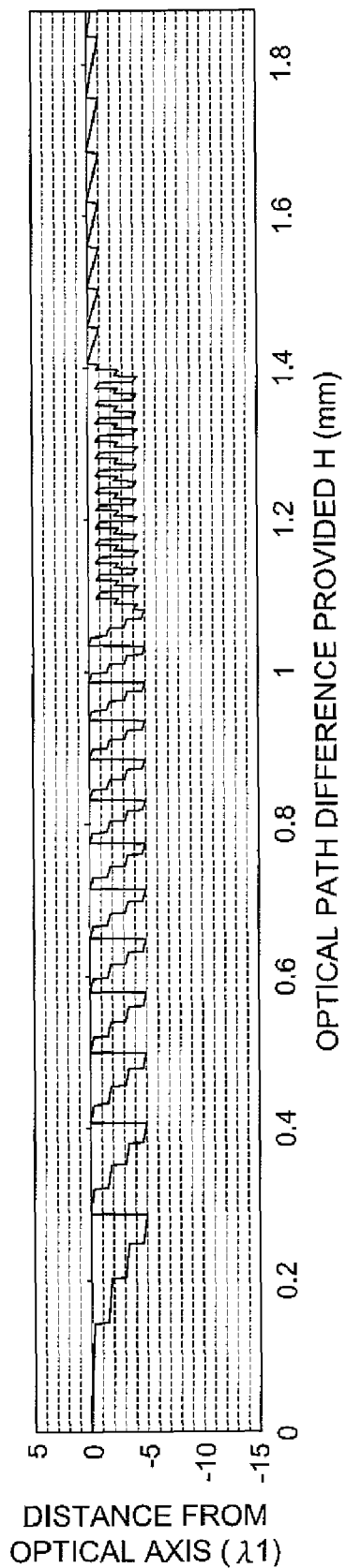
FIG. 11 is an enlarged view showing the examples of the configurations of the optical path difference giving structures in the central region, peripheral region and outermost peripheral region when they are assumed as located on a plane surface, as viewed in the direction of the optical axis.

FIG. 11 is an enlarged view showing the configurations of the optical path difference giving structures in the central region, peripheral region and outermost peripheral region when they are assumed as located on a plane surface. In FIG. 11, the first, second and third optical path difference giving structures are shown in that order as viewed from the left. In FIG. 9, the first, fourth and seventh optical path difference giving structures are shown in that order as viewed from the left. In FIG. 10, the second and fifth optical path difference giving structures are shown in that order as viewed from the left. The first optical path difference giving structure is formed by superimposition between the first and second basic structures. The second optical path difference giving structure is formed by superimposition between the fourth and fifth basic structures. The third optical path difference giving structure is formed by the seventh basic structure.

The first divergent light (with a wavelength $\lambda 1$ of 405 nm) emitted from the blue-violet semiconductor laser LD1 passes through a dichroic prism PPS and is formed into parallel light flux by a collimating lens CL. After that, the light flux is converted from linear polarized light to circular polarized light by a quarter-wave plate (not illustrated), and enters the objective lens OBJ after the light flux diameter has been regulated by a stop ST. In this case, the light flux converged by the central region, peripheral region and outermost peripheral region of the objective lens OBJ turns into a spot formed on the information-recording surface RL1 of the BD through the protective substrate PL1 having a thickness of 0.1 mm.

The reflected light flux modulated by the information pit on the information-recording surface RL1 again passes through the objective lens OBJ and stop ST. After that, the light flux is converted from linear polarized light to circular polarized light by a quarter-wave plate (not illustrated), and is formed into convergent light flux by the collimating lens CL. After entering the dichroic prism PPS, the light flux is converged on the light-receiving surface of the first light-receiving element PD1. The information recorded on the BD is read by focusing and tracking of the objective lens OBJ by the two-axis actuator AC, using the output signal of the first light-receiving element PD1.

The second divergent light (with a wavelength $\lambda 2$ of 658 nm) emitted from the infrared semiconductor laser EP1 is reflected by the prism PS and is reflected by the dichroic prism PPS. After having been converted into the parallel light flux by the collimating lens CL, the light flux is converted from linear polarized light to circular polarized light by a quarter-wave plate (not illustrated), and enters the objective lens OBJ. The light flux converged by the central region and peripheral region of the objective lens OBJ (the light flux having passed through the outermost peripheral region is flared to form the peripheral portion of the spot) turns into a spot formed on the information-recording surface RL2 of the DVD through the protective substrate PL2 having a thickness of 0.6 mm, and forms the center of the spot.

The reflected light flux modulated by the information pit on the information-recording surface RL2 again passes through the objective lens OBJ and stop ST. After that, the light flux is converted from circular polarized light to linear polarized light by a quarter-wave plate (not illustrated), and is formed into convergent light flux by the collimating lens CL. After having been reflected by the dichroic prism PPS, the light flux is reflected twice inside the prism, and then converges on the second light-receiving element DS1. The output signal of the second light-receiving element DS1 is used to read the information recorded on the DVD.

The third divergent light (with a wavelength λ3 of 785 nm) emitted from the infrared semiconductor laser EP2 is reflected by the prism PS and is then reflected by the dichroic prism PPS. After having been converted into the parallel light flux by the collimating lens CL, the light flux is converted from linear polarized light to circular polarized light by a quarter-wave plate (not illustrated), and enters the objective lens OBJ. The light flux converged by the central region of the objective lens OBJ (the light flux having passed through the peripheral region and outermost peripheral region is flared to form the peripheral portion of the spot) turns into a spot formed on the information-recording surface RL3 of the CD through the protective substrate PL3 having a thickness of 1.2 mm.

The reflected light flux modulated by the information pit on the information-recording surface RL3 again passes through the objective lens OBJ and stop ST. After that, the light flux is converted from circular polarized light to linear polarized light by a quarter-wave plate (not illustrated), and is formed into convergent light flux by the collimating lens CL After having been reflected by the dichroic prism PPS, the light flux is reflected twice inside the prism, and then converges on the third light-receiving element DS2. The output signal of the third light-receiving element PD2 is used to read the information recorded on the CD.

EXAMPLES

The following describes the examples that can be used in the aforementioned embodiment. Similarly to the case of the aforementioned embodiment, the objective lens of this example has the first optical path difference giving structure composed of the superimposition between the first and second basic structures formed in the central region; the second optical path difference giving structure composed of the superimposition between the fourth and fifth basic structures formed in the peripheral region; and the third optical path difference giving structure composed of the seventh basic structure alone formed in the outermost peripheral region. The first optical path difference giving structure emits the second order diffracted light with a larger light amount than any diffracted light fluxes with the other diffraction order when the first light flux passes through; emits the 0-th order diffracted light of the second light flux with a larger light amount than any diffracted light fluxes; and emits the minus first order diffracted light of the third light flux with a larger light amount than any diffracted light fluxes. The second optical path difference giving structure emits the first order diffracted light with a larger light amount than any diffracted light fluxes with the other diffraction order when the first light flux passes through; emits the 0-th order diffracted light of the second light flux with a larger light amount than any diffracted light fluxes; and emits the first order diffracted light of the third light flux with a larger light amount than any diffracted light fluxes. The third optical path difference giving structure emits the second order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. The first basic structure is designed in a blazed configuration and emits the first order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. The second basic structure is a four-piece stepwise configuration and emits the first order diffracted light with a larger light amount than any diffracted light fluxes with the other diffraction order when the first light flux passes through; emits the minus first order diffracted light of the second light flux with a larger light amount than any diffracted light fluxes; and emits the minus first order diffracted light of the third light flux with a larger light amount than any diffracted light fluxes. The fourth basic structure is designed in a blazed configuration and emits the first order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes. The fifth basic structure is designed in a three-piece stepwise configuration and emits the 0-th order diffracted light with a larger light amount than any diffracted light fluxes with the other diffraction order when the first light flux passes through; emits the minus first order diffracted light of the second light flux with a larger light amount than any diffracted light fluxes; and emits the 0-th order diffracted light of the third light flux with a larger light amount than any diffracted light fluxes. The seventh basic structure is designed in a blazed configuration and emits the second order diffracted light with a larger light amount than any diffracted light fluxes with the other diffraction order when the first light flux passes through; emits the first order diffracted light of the second light flux with a larger light amount than any diffracted light fluxes; and emits the first order diffracted light of the third light flux with a larger light amount than any diffracted light fluxes.

Tables 1 and 2 show the lens data of the Example 1. In the following description, E will be used to express the exponent of 10 (e.g., 2.5×10⁻³).

The optical surface of the objective lens is formed in an axially symmetric aspherical form about the optical axis that is defined by the Mathematical Formula obtained by substituting the coefficients of the Table into the mathematical expression.

Aspherical surface form [Mathematical Formula 4]

$$X(h) = \frac{(h/R)^2}{1+\sqrt{1-(1+\kappa)(h/R)^2}} + \sum_{i=0}^{10} A_{2i} h^{2i}$$

wherein X(h) is the axis in the direction of optical axis (traveling direction of light is assumed positive), κ is the conical coefficient, $A_{2i}$ is an aspherical surface coefficient, and h is the height from optical axis.

The pitch of the diffraction structure is determined by the portion that is the integer of the optical path difference in Mathematical Formula 5. The length of the optical path given to the light flux of each wavelength for each ring is defined by the mathematical expression obtained by substituting the coefficient of the Table into the function of Mathematical Formula 6.

Optical path difference function [Mathematical Formula 5]

$$\Phi(h) = \sum_{i=0}^{6} B_{2i} h^{2i}$$

Optical path difference given by each optical path difference giving structure [Mathematical Formula 6]

$$\Phi'(h) = D \times \text{MOD}\{\Phi(h)\} \times \lambda_B / \lambda_i + P \times \text{INT}[p \times \text{MOD}\{\Phi(h)\}] \times \lambda_c / \lambda_i$$

wherein $B_{2i}$ is the coefficient of optical path difference function; MOD is the fractional part of a numeral; INT is the integer part of a numeral; $\lambda_B$ is the reference wavelength of the blazed diffraction structure; $\lambda_C$ is the reference wavelength of stepwise diffraction structure; $\lambda_i$ is the wavelength of the incoming light flux; D is the order of diffraction in blazed configuration; P is the optical path difference around the first step of the stepwise configuration; and p is the number of divisions in stepwise configuration.

-continued

| | First surface | Second surface |
|---|---|---|
| A18 | 2.3355E − 06 | — |
| A20 | −4.8778E − 07 | — |

Coefficient of Optical Path Difference Function (First Surface)

| | Central region $0 \leq h < .081$ | Peripheral region $1.081 \leq h < .4043$ | Outermost peripheral region $1.4043 \leq h$ |
|---|---|---|---|
| B2 | −1.2337E + 01 | −2.4675E + 01 | −2.4675E + 01 |
| B4 | 1.2199E + 00 | 2.4398E + 00 | 2.4398E + 00 |
| B6 | −3.8345E − 01 | −7.6690E − 01 | −7.6690E − 01 |
| B8 | 2.3445E − 01 | 4.6889E − 01 | 4.6889E − 01 |
| B10 | −3.4160E − 02 | −6.8320E − 02 | −6.8320E − 02 |

TABLE 2

Configuration of optical path difference giving structure (first surface)

| | $\lambda B$ | $\lambda C$ | D | P | p | Configuration |
|---|---|---|---|---|---|---|
| Central region $0 \leq h < 1.081$ | | | | | | |
| First basic structure | 500 nm | — | 1 | — | — | Blazed |
| Second basic structure | — | 405 nm | — | 1.25 | 4 | Stepwise |

TABLE 1

| Focal distance | $f_1$ = 2.20 mm | | $f_2$ = 2.32 mm | | $f_3$ = 2.40 mm | | |
|---|---|---|---|---|---|---|---|
| Numerical aperture | NA1 = 0.85 | | NA2 = 0.60 | | NA3 = 0.45 | | |
| Imaging magnification | m = 0 | | m = 0 | | m = 0 | | |
| i-th surface | ri | di (405 nm) | ni (405 nm) | di (655 nm) | ni (655 nm) | di (785 nm) | ni (785 nm) | |
| 0 | ∞ | | | ∞ | | ∞ | | |
| 1 | 1.47539 | 2.70 | 1.52469 | 2.70 | 1.50651 | 2.70 | 1.5032 | Aspherical surface |
| 2 | −2.22613 | 0.67519 | 1.00000 | 0.5132 | 1.00000 | 0.24947 | 1.0000 | Aspherical surface |
| 3 | ∞ | 0.10 | 1.62230 | 0.60 | 1.57995 | 1.20 | 1.5733 | |
| 4 | ∞ | | | | | | | |

* di indicates the displacement from the i-th surface to i-th + first surface

Data on Aspherical Surface and Diffraction Surface (Function of Optical Path Difference)
Aspherical Surface Coefficient

| | First surface | Second surface |
|---|---|---|
| κ | −6.0762E − 01 | −3.1092E + 01 |
| A4 | 8.1454E − 03 | 8.0690E − 02 |
| A6 | 8.7988E − 04 | −5.7930E − 02 |
| A8 | 2.6303E − 04 | 1.8637E − 02 |
| A10 | 1.2237E − 04 | −7.0213E − 04 |
| A12 | 1.6637E − 05 | −1.2306E − 03 |
| A14 | −1.1944E − 05 | 2.4548E − 04 |
| A16 | −8.9121E − 07 | — |

TABLE 2-continued

Configuration of optical path difference giving structure (first surface)

| | $\lambda B$ | $\lambda C$ | D | P | p | Configuration |
|---|---|---|---|---|---|---|
| Peripheral region $1.081 \leq h < 1.4043$ | | | | | | |
| First basic structure | 405 nm | — | 1 | — | — | Blazed |
| Second basic structure | — | 405 nm | — | −2 | 3 | Stepwise |
| Outermost peripheral region $1.4043 < h$ | | | | | | |
| First basic structure | 405 nm | — | 2 | — | — | Blazed |
| Second basic structure | — | — | — | — | — | — |

For the outermost peripheral region, the first basic structure is equal to the optical path difference giving structure
Diffraction Efficiency in Each Region

|  | 405 nm | 655 nm | 785 nm |
| --- | --- | --- | --- |
| Central region | 72% | 71% | 55% |
| Peripheral region | 100% | 88% | — |
| Outermost peripheral region | 100% | — | — |
| Within effective diameter | 91% | 78% | 55% |

As will be apparent from Table 2, in the central region, the diffraction efficiency of the second-order diffracted light having a wavelength of 405 nm is 72%; the diffraction efficiency of the 0-th order diffracted light having a wavelength of 655 nm is 71%; and the diffraction efficiency of the minus first order diffracted light having a wavelength of 785 nm is 55%. In the peripheral region, the diffraction efficiency of the first-order diffracted light having a wavelength of 405 nm is 100% and the diffraction efficiency of the 0-th order diffracted light having a wavelength of 655 nm is 88%. In the outermost peripheral region, the diffraction efficiency of the second-order diffracted light having a wavelength of 405 nm is 91%. The diffraction efficiency for the overall optical surface of the objective lens with the aforementioned factors taken into account is 91% when the wavelength is 405 nm, 78% when the wavelength is 655 nm, and 55% when the wavelength is 785 nm. Thus, high diffraction efficiency is obtained for all three wavelengths.

What is claimed is:

1. An objective lens for use in an optical pickup apparatus which
    forms a convergent spot on an information-recording surface of a first optical disk having a t1-thick protective layer, using a first light flux having a wavelength λ1 emitted from a first light source,
    forms a convergent spot on an information-recording surface of a second optical disk having a t2-thick protective layer (t1≦t2), using a second light flux having a wavelength λ2(λ1<λ2) emitted from a second light source, and
    forms a convergent spot on an information-recording surface of a third optical disk having a t3-thick protective layer (t2<t3), using a third light flux having a wavelength λ3(λ2<λ3) emitted from a third light source;
    the objective lens comprising an optical surface provided with a first optical path difference giving structure,
    wherein the first optical path difference giving structure
        emits a L-th order diffracted light with a larger light amount than any diffracted light fluxes with the other diffraction order (including 0-th order), when the first light flux passes through the first optical path difference giving structure,
        emits a M-th order diffracted light with a larger light amount than any diffracted light fluxes with the other diffraction order, when the second light flux passes through the first optical path difference giving structure, and
        emits a N-th order diffracted light with a larger light amount than any diffracted light fluxes with the other diffraction order (including 0-th order), when the third light flux passes through the first optical path difference giving structure; and,
    the following formula is satisfied;

$|L|=2, M=0, |N|=1$, and the L and N are opposite in positive/negative signs.

2. The objective lens of claim 1,
    wherein the optical surface of the objective lens comprising:
    a central region including the optical axis;
    a ring-shaped peripheral region formed around the central region; and
    a ring-shaped outermost peripheral region formed around the peripheral region;
    wherein the first light flux which passed through the central region, the ring-shaped peripheral region and the ring-shaped outermost peripheral region is converged onto the information-recording surface of the first optical disk;
    the second light flux which passed through the central region and the ring-shaped peripheral region is converged onto the information-recording surface of the second optical disk; and
    the third light flux which passed through the central region is converged onto the information-recording surface of the third optical disk.

3. The objective lens of claim 2,
    wherein the first optical path difference giving structure is formed in the central region.

4. The objective lens of claim 1,
    wherein the first optical disk is a Blu-ray Disk.

5. The objective lens of claim 1,
    wherein the objective lens is a single lens.

6. The objective lens of claim 1,
    wherein the first optical path difference giving structure is configured in such a way that a first basic structure and a second basic structure different from the first basic structure are superimposed with each other to ensure that the positions of all the level differences of the first basic structure are overlapped to be matched with the positions of the level differences of the second basic structure.

7. An optical pickup apparatus having an objective lens which
    forms a convergent spot on an information-recording surface of a first optical disk having a t1-thick protective layer, using a first light flux having a wavelength λ1 emitted from a first light source,
    forms a convergent spot on an information-recording surface of a second optical disk having a t2-thick protective layer (t1≦t2), using a second light flux having a wavelength λ2(λ1<λ2) emitted from a second light source, and
    forms a convergent spot on an information-recording surface of a third optical disk having a t3-thick protective layer (t2<t3), using a third light flux having a wavelength λ3(λ2<λ3) emitted from a third light source,
    the objective lens comprising an optical surface provided with a first optical path difference giving structure,
    wherein the first optical path difference giving structure
        emits a L-th order diffracted light with a larger light amount than any diffracted light fluxes with the other diffraction order (including 0-th order), when the first light flux passes through the first optical path difference giving structure, emits a M-th order diffracted light with a larger light amount than any diffracted light fluxes with the other diffraction order, when the second light flux passes through the first optical path difference giving structure, and emits a N-th order diffracted light with a larger light amount than any diffracted light fluxes with the other diffraction order (including 0-th order), when the third light flux passes through the first optical path difference giving structure; and, the following formula is satisfied;

$$|L|=2, M=0, |N|=1, \text{ and}$$

the L and N are opposite in positive/negative signs.

8. The optical pickup apparatus of claim 7,
wherein the optical surface of the objective lens comprising:
a central region including the optical axis;
a ring-shaped peripheral region formed around the central region; and
a ring-shaped outermost peripheral region formed around the ring-shaped peripheral region;
wherein the first light flux which passed through the central region, the ring-shaped peripheral region and the ring-shaped outermost peripheral region is converged onto the information-recording surface of the first optical disk;
the second light flux which passed through the central region and the ring-shaped peripheral region is converged onto the information-recording surface of the second optical disk; and
the third light flux which passed through the central region is converged onto the information-recording surface of the third optical disk.

9. The optical pickup apparatus of claim 8,
wherein the first optical path difference giving structure is formed in the central region.

10. The optical pickup apparatus of claim 7,
wherein the first optical disk is a Blu-ray Disk.

11. The optical pickup apparatus of claim 7,
wherein the objective lens is a single lens.

12. The optical pickup apparatus of claim 7,
wherein the first optical path difference giving structure is configured in such a way that a first basic structure and a second basic structure different from the first basic structure are superimposed with each other to ensure that the positions of all the level differences of the first basic structure are overlapped to be matched with the positions of the level differences of the second basic structure.

13. The optical pickup apparatus of claim 7;
wherein the formula (1) is satisfied by the image forming magnification m1 of the objective lens when the first light flux enters the objective lens:

$$-0.02 < m1 < 0.02 \qquad (1).$$

14. The optical pickup apparatus of claim 13,
wherein the formula (2) is satisfied by the image forming magnification m2 of the objective lens when the second light flux enters the objective lens, and the following formula (3) is satisfied by the image forming magnification m3 of the objective lens when the third light flux enters the objective lens:

$$-0.02 < m2 < 0.02 \qquad (2)$$

$$-0.02 < m3 < 0.02 \qquad (3).$$

15. The optical pickup apparatus of claim 13,
wherein the following formula (4) is satisfied by the image forming magnification m2 of the objective lens when the second light flux enters the objective lens:

$$-0.10 < m2 < 0 \qquad (4).$$

16. The optical pickup apparatus of claim 13,
wherein the formula (5) is satisfied by the image forming magnification m3 of the objective lens when the third light flux enters the objective lens:

$$-0.10 < m3 < 0 \qquad (5).$$

* * * * *